US012730028B2

(12) United States Patent
Hermes et al.

(10) Patent No.: US 12,730,028 B2
(45) Date of Patent: Sep. 8, 2026

(54) METHOD AND SYSTEM WITH MULTI-CONDUCTOR SENSORS FOR MOISTURE MONITORING OF STRUCTURES

(71) Applicant: SMT Research Ltd., Vancouver (CA)

(72) Inventors: Jamieson William Merritt Hermes, Burnaby (CA); Khaleed Khondoker, Surrey (CA); Gregory Lee, Burnaby (CA); Asif Al Noor, Burnaby (CA); Jason Glen Teetaert, Vancouver (CA)

(73) Assignee: SMT Research Ltd., Vancouver (CA)

( * ) Notice: Subject to any disclaimer, the term of this patent is extended or adjusted under 35 U.S.C. 154(b) by 715 days.

(21) Appl. No.: 18/020,905

(22) PCT Filed: Aug. 11, 2021

(86) PCT No.: PCT/CA2021/051109
§ 371 (c)(1),
(2) Date: Feb. 10, 2023

(87) PCT Pub. No.: WO2022/032386
PCT Pub. Date: Feb. 17, 2022

(65) Prior Publication Data

US 2023/0314265 A1 Oct. 5, 2023

Related U.S. Application Data

(60) Provisional application No. 63/064,862, filed on Aug. 12, 2020.

(51) Int. Cl.
*G01M 3/16* (2006.01)
*E04D 13/00* (2006.01)
(Continued)

(52) U.S. Cl.
CPC ............. *G01M 3/16* (2013.01); *E04D 13/006* (2013.01); *H04W 4/38* (2018.02); *E04D 5/00* (2013.01)

(58) Field of Classification Search
None
See application file for complete search history.

(56) References Cited

U.S. PATENT DOCUMENTS 9,500,555 B2 11/2016 Gunness
9,624,671 B1 4/2017 Gunness
(Continued)

FOREIGN PATENT DOCUMENTS

CA 2645384 5/2010

*Primary Examiner* — Alexander A Mercado
(74) *Attorney, Agent, or Firm* — Nexus Law Group LLP; Nicholas Toth; Otto Zsigmond

(57) ABSTRACT

A system and method for monitoring moisture at a structural component having a membrane for fluid impermeability and a deck for supporting the membrane at a first side of the membrane opposite a second side of the membrane is provided. The system includes: (a) a plurality of sensors spaced apart from each other adjacent to the membrane at the second side, the plurality of sensors including one or more wireless sensors, each of the sensors including a plurality of sensor conductors and a connection member connecting the plurality of sensor conductors to each other while electrically insulating the sensor conductors from each other; and (b) a controller operable to selectively communicate wirelessly with each of the wireless sensors, and operable to selectively determine a sensor output from each of the sensors.
The method involves measuring resistance for longterm tracking of pooling of an electrically conductive fluid on the structural component.

20 Claims, 12 Drawing Sheets

(51) Int. Cl.
*H04W 4/38* (2018.01)
*E04D 5/00* (2006.01)

(56) References Cited

U.S. PATENT DOCUMENTS

| | | | | |
|---|---|---|---|---|
| 9,695,593 | B2 | 7/2017 | Vokey et al. | |
| 10,352,047 | B2 | 7/2019 | Vokey et al. | |
| 10,519,664 | B1 | 12/2019 | Gunness | |
| 2014/0114590 | A1 | 4/2014 | Gunness | |
| 2018/0202163 | A1 | 7/2018 | Vokey et al. | |
| 2018/0271356 | A1* | 9/2018 | Antonioli | A61B 1/00128 |
| 2023/0066225 | A1* | 3/2023 | Vokey | G01M 3/04 |
| 2023/0069325 | A1* | 3/2023 | Vokey | G01M 3/165 |

* cited by examiner 22
44
48
WIRELESS COMMUNICATIONS 42
MEMORY 32
52
CPU 30
36
SWITCHES 38
CONTROLLER 28
34
14
76
74
72
78
24
26

88
ENTER
DE-ENERGIZE THE PERIMETER GUARD, ANY FIXTURE GUARDS, AND ANY WIRED SENSORS
RETURN

90
ENTER
SELECT A PAIR OF SENSOR CONDUCTORS OF THE PLURALITY OF SENSORS
RETURN

92
ENTER
94
MEASURE RESISTANCE BETWEEN THE PAIR OF SENSOR CONDUCTORS
96
STORE THE MEASURED RESISTANCE IN ASSOCIATION WITH A LOCATION OF THE PAIR OF SENSOR CONDUCTORS
RETURN

98
ENTER
CONNECT TO AN UNGUARDED ELECTRICAL GROUNDING PATH AT A TEST LOCATION ON THE MEMBRANE AT ITS UPPER SIDE
RETURN

100
ENTER
102
SELECT A SET OF SENSORS IN RESPONSE TO THE TEST LOCATION
C
104
SELECT AT LEAST ONE OF A PERIMETER-GUARD VOLTAGE, A FIXTURE-GUARD VOLTAGE, AND A SENSOR-EXCITATION VOLTAGE
B
106
SELECT A SENSOR FROM THE SET
A

METHOD AND SYSTEM WITH MULTI-CONDUCTOR SENSORS FOR MOISTURE MONITORING OF STRUCTURES

BACKGROUND OF THE INVENTION

1. Field of Invention

This invention relates to civionics and, in particular, to a method and system with multi-conductor sensors for detecting leaks in building structures.

2. Description of Related Art

A low-sloped roof traditionally includes a roof deck, such as may be made of concrete or similar building material, a water impermeable membrane assembly on top of the roof deck, and optionally overburden, such as may be formed of aggregate material, laid on top of the membrane assembly.

Some roofs have included a grid of longitudinally and laterally disposed electrically conductive wires or tape which are electrically insulated from each other. The grid is installed above the membrane assembly and beneath the overburden, for the purpose of detecting moisture ingress into the building structure through defects in the membrane. Such moisture ingress detection relies on the moisture present on the roof including elemental ions which create a detectable electrical current when the ions flow through a defect.

Installing a grid of many wires close together improves the resolution of the moisture detection, thereby permitting detection of the location of any defect with greater precision. However, using many wires close together increases installation and maintenance costs. On the other hand, reducing costs by spacing grid wires further apart from each other degrades moisture detection resolution.

An object of the invention is to address the above shortcomings.

SUMMARY

The above shortcomings may be addressed by providing, in accordance with one aspect of the invention, a system for monitoring moisture at a structural component. The structural component includes a membrane for fluid impermeability and a deck for supporting the membrane at a first side of the membrane opposite a second side of the membrane. The system includes: (a) a plurality of sensors spaced apart from each other adjacent to the membrane at the second side, the plurality of sensors including one or more wireless sensors, each of the sensors including a plurality of sensor conductors and a connection member connecting the plurality of sensor conductors to each other while electrically insulating the sensor conductors from each other; and (b) a controller operable to selectively communicate wirelessly with each of the wireless sensors, and operable to selectively determine a sensor output from each of the sensors.

The connection member may include a plurality of arms projecting from a center of the connection member toward a plurality of arm ends, respectively. Each of the arm ends may include one of the sensor conductors. Each of the sensors may include four of the sensor conductors. Each arm may project substantially at right angles to the arms adjacent to it. The one or more wireless sensors may include a transponder-equipped sensor that may include a transponder for transmitting the sensor output in response to wirelessly receiving a request. The transponder-equipped sensor may include an antenna for wireless communications. The transponder-equipped sensor may include a charging coil for charging electrical circuitry of the transponder-equipped sensor. The one or more wireless sensors may include a battery-powered sensor that may include a battery. The plurality of sensors may include one or more wired sensors. The controller may be operable to selectively energize each of the wired sensors with a sensor-excitation voltage. The one or more wireless sensors may include a chargeable sensor. At least one of the wired sensors may be operable to emit alternating current electrical power for transmission through an electrically conductive fluid adjacent the membrane at its second side so as to charge the chargeable sensor. The controller may be operable to determine resistance between a pair of the sensor conductors. The controller may be operable to store the resistance in association with at least one of the date, time, and a weather parameter. The controller may be operable to determine in response to a plurality of the resistances an indication of pooling of an electrically conductive fluid adjacent the membrane at its second side. The controller may be operable to associate the pooling with an area of the structural component. The controller may be operable to associate the area with multiple occurrences of the pooling of the electrically conductive fluid. The controller may be operable to track changes in the pooling over time. The controller may be operable to associate the pooling with the weather parameter. The weather parameter may include occurrences of precipitation. The weather parameter may include humidity. The controller may be operable to determine a potential difference between the pair of sensor conductors. The controller may be operable to determine a voltage vector in response to the potential difference. The controller may be operable to determine a leak location in response to a plurality of the voltage vectors.

In accordance with another aspect of the invention, there is provided a method of monitoring moisture at a structural component having a membrane for fluid impermeability and a deck for supporting the membrane at a first side of the membrane opposite a second side of the membrane. The method involves: (a) selecting a first sensor from among a plurality of sensors spaced apart from each other adjacent to the membrane at the second side when the plurality of sensors include one or more wireless sensors and when each of the sensors includes a plurality of sensor conductors and a connection member connecting the plurality of sensor conductors to each other while electrically insulating the sensor conductors from each other; and (b) determining a sensor output from the first sensor by a controller operable to selectively communicate wirelessly with each of the wireless sensors.

Step (b) may involve the controller receiving the sensor output via wireless communications in response to wirelessly transmitting a request to the first sensor when the first sensor is one of the wireless sensors. The method may further involve wirelessly powering the first sensor. The method may further involve wirelessly charging the first sensor. Step (a) may involve selecting the first sensor when the plurality of sensors includes one or more wired sensors. Step (b) may involve determining the sensor output when the controller is operable to selectively energize each of the wired sensors. Step (a) involves selecting the first sensor when the plurality of sensors includes one or more wired sensors. Wirelessly charging the first sensor may involve causing at least one of the wired sensors to emit alternating current electrical power for transmission through an electrically conductive fluid adjacent the membrane at its second side so as to charge the first sensor. The method may further involve calibrating at least one of a perimeter-guard voltage, a fixture-guard voltage, and a sensor-excitation voltage. The method may further involve energizing a set of the wired sensors with the sensor-excitation voltage. The method may involve the controller determining resistance between a pair of the sensor conductors. The method may involve storing the resistance in association with at least one of the date, time, and a weather parameter. The method may involve determining, in response to a plurality of the resistances, an indication of pooling of an electrically conductive fluid adjacent the membrane at its second side. The method may involve associating the pooling with an area of the structural component. The method may involve associating the area with multiple occurrences of the pooling of the electrically conductive fluid. The method may involve tracking changes in the pooling over time. The method may involve associating the pooling with the weather parameter. The method may involve associating the pooling with the weather parameter when the weather parameter includes occurrences of precipitation. The method may involve associating the pooling with the weather parameter when the weather parameter includes humidity. The method may involve the controller determining a potential difference between the pair of sensor conductors. The method may involve the controller determining a voltage vector in response to the potential difference. The method may involve the controller determining a leak location in response to a plurality of the voltage vectors.

In accordance with another aspect of the invention, there is provided a system for monitoring moisture at a structural component. The structural component includes a membrane for fluid impermeability and a deck for supporting the membrane at a first side of the membrane opposite a second side of the membrane. The system includes: (a) means for sensing an electrical parameter associated with an electrically conductive fluid adjacent the membrane at the second side; (b) control means for controlling the means for sensing the electrical parameter associated with the electrically conductive fluid adjacent the membrane at the second side; and (c) means for communicating wirelessly between the control means and the means for sensing the electrical parameter associated with the electrically conductive fluid adjacent the membrane at the second side.

The foregoing summary is illustrative only and is not intended to be in any way limiting. Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention.

DETAILED DESCRIPTION

A system for monitoring moisture at a structural component, the structural component comprising a membrane for fluid impermeability and a deck for supporting the membrane at a first side of the membrane opposite a second side of the membrane, includes: (a) means for sensing an electrical parameter associated with an electrically conductive fluid adjacent the membrane at the second side; (b) control means for controlling the means for sensing the electrical parameter associated with the electrically conductive fluid adjacent the membrane at the second side; and (c) means for communicating wirelessly between the control means and the means for sensing the electrical parameter associated with the electrically conductive fluid adjacent the membrane at the second side.

Figures 1, 2:
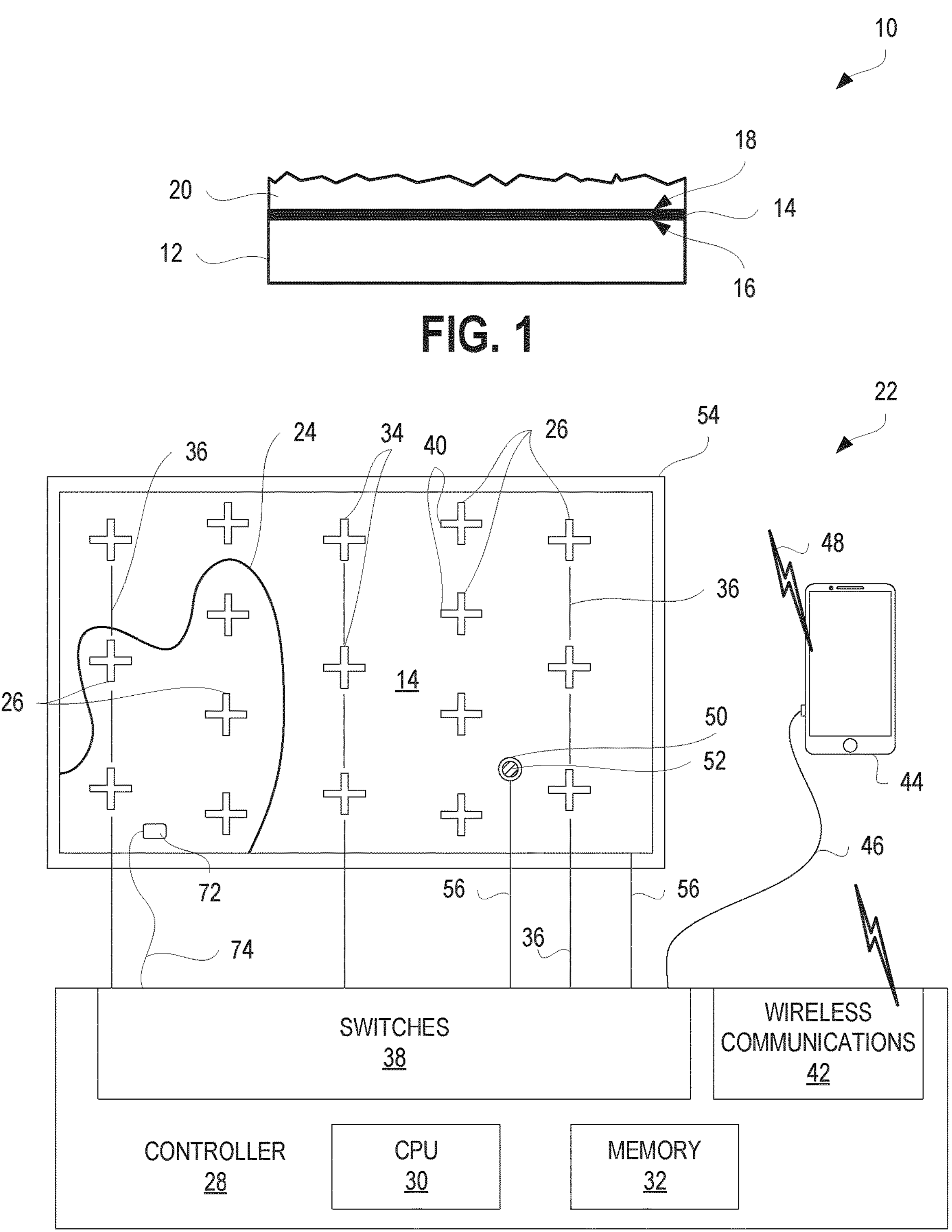
FIG. 1 is a sectional view of a structural component, showing a fluid impermeable membrane between a supporting deck and overburden of a building roof.
FIG. 2 is a block diagram and schematic representation of a system for monitoring moisture at the structural component according to a first embodiment of the invention.

Referring to FIG. 1, the structural component may be or form part of a building structure, such as being a low-sloped building roof 10 of a building. The building roof 10, a section of which is shown in FIG. 1, includes a deck 12 typically made of reinforced concrete or other structural material.

Supported by the deck 12 is a membrane 14 defining a lower side 16 adjacent the deck 12 and an upper side 18 opposite the lower side 16. The membrane 14 is intended to be fluid impermeable so that fluids, including rainwater, cannot penetrate through the membrane 14 to contact the deck 12. For illustration purposes, the membrane 14 is shown thicker in FIG. 1 than is typical.

Overburden 20 lies adjacent the upper side 18 of the membrane 14. The overburden 20 is any material placed over the membrane 14, and can include any one or more of insulation, drain mat, retention mat, ballast, pavers, brick tiles, aggregate, gravel, sand, filter fabric, soil, vegetation, other building, landscaping, or decorative materials, or any combination thereof for example. In some embodiments minimal or no overburden 20 is used, while in other embodiments large trees and other green roofing technologies are employed for example.

Referring to FIGS. 1 and 2, a moisture monitoring system 22 is operable to detect water leaks through the membrane 14. Any breach of the membrane 14 that would allow water to leak from its upper side 18 to its lower side 16 creates an electrically conductive pathway between the upper side 18 of the membrane 14 and the deck 12. By measuring electrical conductivity and/or electrical current between an electrically conductive fluid, such as the water 24, atop the membrane 14 and the deck 12, the system 22 is operable to detect water leaks at the building roof 10.

The moisture monitoring system 22 includes sensors 26 for sensing electrical parameters such as potential energy, voltage, current, and resistance. The sensors 26 are disposed adjacent to the membrane 14 at its upper side 18. The sensors 26 are typically placed prior to installation of any overburden 20. In some embodiments, the sensors are affixed, such as by using adhesive (not shown), to the membrane 14. To maintain the fluid impermeability of the membrane 14, fasteners that would penetrate through the membrane 14 are generally not used. Typically, the sensors 26 remain in place by placing overburden 20 overtop the sensors 26 and on the membrane 14 after the sensors 26 have been installed. As shown in FIG. 2, the sensors 26 are typically arranged spaced apart from each other to form an array of sensors 26. While FIG. 2 shows a rectangular grid-like arrangement, the system 22 advantageously permits the sensors 26 to be arranged in any suitable manner with any desired spacing between various pairs of the sensors 26.

Referring to FIG. 2, the system 22 includes a controller 28 operable to control operations of the sensors 26. The controller 28 may be any computing device such as a general purpose computer, microcomputer, laptop computer, tablet computer, personal device, minicomputer, mainframe computer, distributed network for computing, functionally equivalent discrete hardware components, etc. and any combination thereof, for example. In the first embodiment, the controller 28 includes processing circuitry, such as the central processing unit (CPU) 30 and the memory 32 shown in FIG. 2.

The CPU 30 may be implemented by one or more integrated circuits (IC), including being implemented by a monolithic integrated circuit (MIC), an Application Specific Integrated Circuit (ASIC), a Field Programmable Gate Array (FPGA), programmable logic controller (PLC), etc. or any combination thereof. The CPU 30 may include circuitry for storing memory, such as digital data, and may comprise the memory 32 or be in wired or wireless communication with the memory 32, for example.

The memory 32 is operable to store digital representations of data or other information, including measurement results and/or control information, and to store digital representations of program data or other information, including program code for directing operations of the CPU 30. The memory 32 may be operable to store digital representations as volatile memory, non-volatile memory, dynamic memory, etc. or any combination thereof. The memory 32 in the first embodiment encompasses a database for storing data in association with other data.

Still referring to FIG. 2, the sensors 26 in some embodiments include wired sensors 34 connected by electrical wires 36 to the controller 28. In such embodiments, the controller 28 includes a number of switches 38 for selectively connecting to or disconnecting from each wired sensor 34 via its wire or wires 36. In the first embodiment, the controller 28 is operable to selectively energize or not energize each wired sensor 34 via its wire or wires 36.

In the first embodiment, the sensors 26 include one or more wireless sensors 40 operable to perform wireless communications. The controller 28 in the first embodiment is operable to control operations of the wireless sensors 40, including being operable to selectively communicate wirelessly with each wireless sensor 40. In some embodiments, the controller 28 is operable to selectively communicate with each wireless sensor 40 via direct wireless communications employing a wireless communications module 42 of the controller 28. Additionally or alternatively, the system 22 in some embodiments includes a separate wireless communications device, such as the handheld wireless communications device 44 shown in FIG. 2, that is in wired or wireless communication with the CPU 30 and is operable, within a certain physical distance, to communicate wirelessly with the wireless sensor 40 so as to facilitate wireless communications between the controller 28 and the given wireless sensor 40. In the embodiment shown in FIG. 2, the handheld communications device 44 is operable to communicate with the controller 28 via both a wired connection 46 and a wireless connection 48, although in embodiments either connection type alone is sufficient. In some embodiments, the wireless device 44 is operable to communicate with the controller 28 via an Internet connection (not shown) that can be wired, wireless or a combination of wired and wireless connections. In some embodiments, the handheld wireless device 44 is a RFID (radio-frequency identification) reader.

Referring to FIGS. 1 and 2, the building roof 10 may include a variety of fixtures that are electrically connected to the deck 12. Such fixtures may include water drains, pipes, parapets, and other features of the building that can create an electrical pathway from the upper side 18 to the lower side 16 of the membrane 14 and to the deck 12. To prevent the system 22 from misinterpreting such fixtures as a leak in the building roof 10, electrical guards are placed atop the membrane 14 between the fixture(s) and the sensors 26.

Referring to FIG. 2, a fixture guard 50 circumscribes a drain fixture 52 so that moisture monitoring outside of the area circumscribed by the fixture guard 50 is unaffected by the drain fixture 52. Also shown in FIG. 2 is a perimeter guard 54 that circumscribes all of the sensors 26 so that any fixture outside of the perimeter defined by the perimeter guard 54, such as a parapet (not shown), does not affect moisture monitoring within that perimeter. While the perimeter shown in FIG. 2 is rectangular, in general perimeter guards 54 may have any shape possible in civionics. While FIG. 2 shows one fixture guard 50 and one perimeter guard 54, in general a given roof 10 may include any number of any type of fixtures, including multiple perimeter guards 54 circumscribing different sections of the roof 10 for example.

As shown in FIG. 2, the fixture guard 50 and the perimeter guard 54 are connected by guard wires 56 to the controller 28. In the first embodiment, the controller 28 is operable to employ its switches 38 to selectively energize any fixture guards 50 with a fixture-guard voltage and operable to selectively energize the perimeter guard 54 with a perimeter-guard voltage. Typically, the fixture-guard voltage and the perimeter-guard voltage are DC (direct-current) voltages that serve to electrify any water 24 that is in contact with the energized guard(s).

Figures 3, 4, 5:
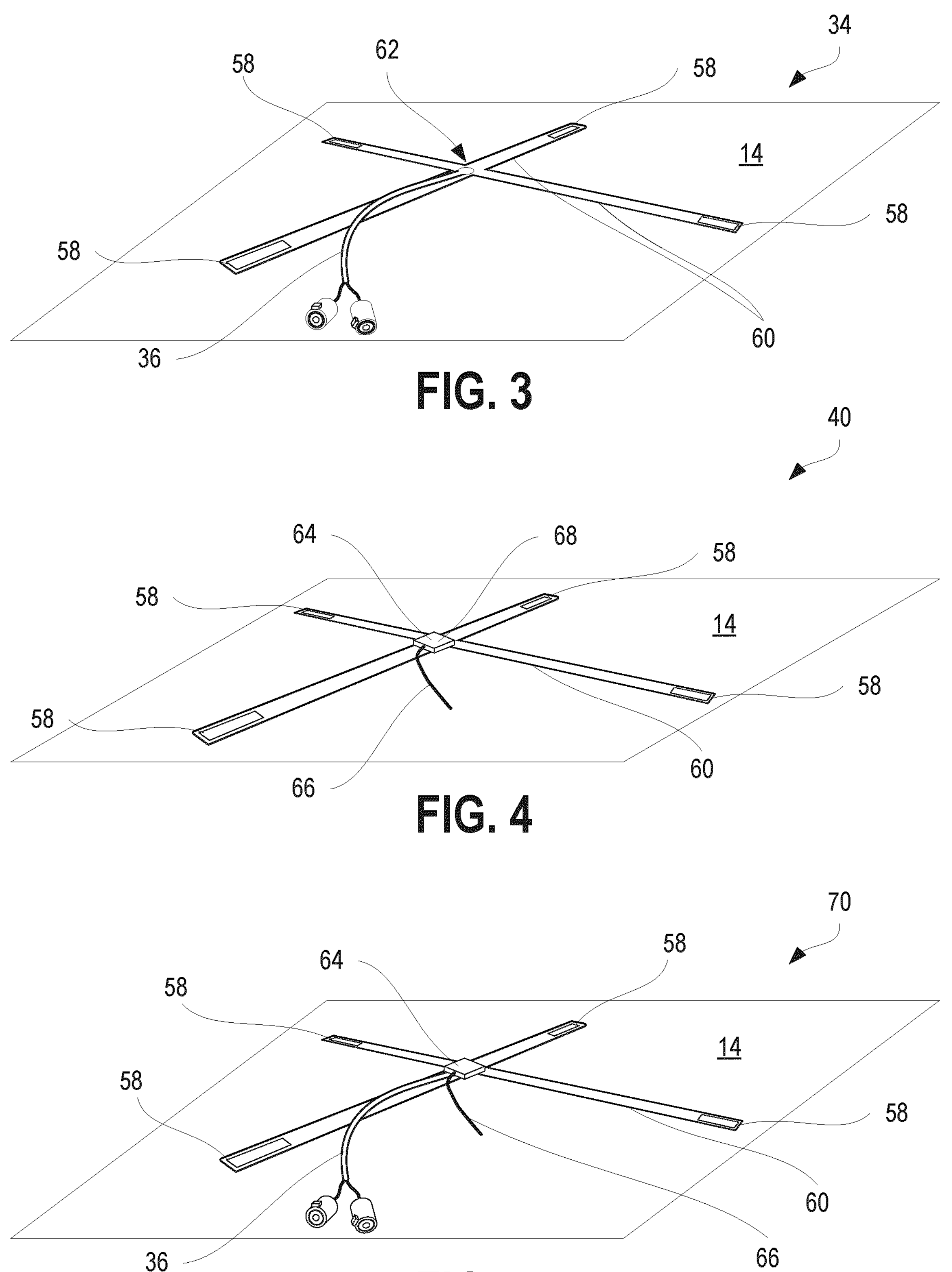
FIG. 3 is a perspective view of a wired sensor of the system shown in FIG. 2, showing multiple sensor pads.
FIG. 4 is a perspective view of a wireless sensor of the system shown in FIG. 2, showing a transceiver and antenna.
FIG. 5 is a perspective view of a wired-and-wireless sensor of the system shown in FIG. 2, showing wires and the transceiver and antenna.

Referring to FIG. 3, the wired sensor 34 includes a plurality of sensor conductors, such as the sensor pads 58 shown in FIG. 3, attached to but separated from each other by a connection member such as the boards 60 shown in FIG. 3. Each sensor pad 58 is made of electrically conductive material, such as copper, conductive ink, other conductive material, or the like, while the boards 60 electrically insulate the sensor pads 58 from each other. The boards 60 may be made from FR-4 composite material or the like, for example, and the sensor pads 58 may be laminated, printed, adhered, or the like, onto the boards 60 at the terminal end of each board 60 arm. From the center 62 of the sensor 26, according to the first embodiment, each board 60 arm terminates at one sensor pad 58 such that there are two sensor pads 58 for each board 60 at opposing ends thereof. A given sensor 26 may include as little as one board 60 defining two board 60 arms, or any plural number of boards 60. In the first embodiment, multiple boards 60 of a sensor 26 are typically attached to each other at the center 62, although other shapes of sensors 26 are within the scope of the invention contemplated herein. Multiple boards 60 of a given sensor 26 may be attached to each other by any suitable adhesive, fastener(s), welding, integral connection, other attachment technique, or any combination thereof for example. By way of example, the boards 60 shown in FIG. 3 are connected to each other at their respective centers 62 by adhesive.

FIG. 3 shows two boards 60 perpendicularly connected to each other such that each board 60 arm projects from the center 62 at right angles to its two adjacent board 60 arms. Regardless of the number of board 60 arms of a given sensor 26, each board 60 arm typically projects substantially equiangularly to its two adjacent board 60 arms. However, in general any suitable shape, angles, and arrangement of board 60 arms may be employed. In some embodiments, a plurality of boards 60 are connected to each other at connection points away from their respective centers 62 in a desired configuration and arrangement.

The wired sensor 34 of FIG. 3 includes the wires 36 for connecting the wired sensor 34 to the controller 28 (FIG. 2). In the first embodiment, one wire 36 is connected between the controller 28 and each sensor pad 58 of the wired sensor 34. In this manner, the controller 28 is operable to selective between each separate sensor pad 58. In the first embodiment, the controller 28 is operable via the wires 36 to selectively energize each sensor pad 58, de-energize each sensor pad 58, determine the electrical voltage at each sensor pad 58, and selectively disconnect from each sensor pad 58, for example. Any suitable connectors or other connection techniques may be employed for connecting the wires 36 to the switches 38 of the controller 28.

Referring to FIGS. 2 and 4, the wireless sensor 40 in the first embodiment includes a transceiver 64 for communicating wirelessly with the controller 28, either directly with the wireless communications module 42 and/or indirectly via the handheld wireless communications device 44. In the first embodiment, the transceiver 64 includes an antenna 66. In variations of embodiments, the transceiver 64 with or without the antenna 66 is operable to receive and/or transmit wireless signals via any existing overburden 20 (FIG. 1), via air above the wireless sensor 40, via any electrically conductive fluid, such as the water 24, present on the upper side 18 of the membrane 14, or via any other medium surrounding the wireless sensor 40. As is clearly shown in FIG. 4, the transceiver 64 is physically attached to at least one board 60 arm.

In some embodiments, the transceiver 64 is a transponder 68 that is operable to wirelessly receive a request for data, to process the request, and to transmit an output in response to the received request.

The output of the wireless sensor 40 may variously be a digital representation of voltage at one or more specified sensor pad(s) 58 of the wireless sensor 40, digital representation of a voltage differential associated with two or more specified sensor pads 58, digital representation of resistance associated with the one or more specified sensor pads 58, digital representation of resistance between two or more specified sensor pads 58, other measurement data, status data, or any combination thereof for example.

The wireless sensor 40 of FIG. 4 does not have a wired connection to the controller 28 and is not operable to perform wired communications.

Referring to FIG. 5, sensors 26 in some embodiments include a wired-and-wireless sensor 70 equipped to perform both wired and wireless communications. In such embodiments the sensor 70 includes the wire(s) 36 and a transmitter, receiver, or transceiver 64.

In the embodiment shown in FIGS. 2 and 5, the sensor 70 includes the transceiver 64 and the antenna 66 for wireless communications with wireless sensors 40. In one exemplary scenario, the sensor 70 receives a request from the controller 28 via its wires 36, wirelessly transmits the request to one or more wireless sensors 40 via the water 24, wirelessly receives a reply from a wireless sensor 40, and delivers the reply to the controller 28 via its wires 36. Such exemplary scenario is in addition or alternative to the wireless sensor 40 communicating with the wireless communications module 42 and/or the handheld communications device 44. As is clearly shown in FIG. 5, the transceiver 64 is physically attached to at least one board 60 arm.

In some embodiments, the sensor 70 is operable to receive electrical power directly from or under the control of the controller 28 via its wires 36, and to wirelessly transmit low-frequency AC (alternating current) or other transmittable electrical power through the water 24 atop the membrane 14 for charging one or more wireless sensor(s) 40 (FIG. 4). In such embodiments, the wireless sensor 40 is operable to be charged wirelessly. By way of example, the antenna 66 of the wireless sensor 40 receives the AC power via the water 24 from one or more sensors 70. The wirelessly received electrical power is typically rectified (i.e. converted from AC to DC electrical power) by circuitry of the wireless sensor 40 and then used to charge an electrical charge storage device of the wireless sensor 40, such as a battery, capacitor, or the like. The stored energy is thereafter available to the wireless sensor 40 for its continued operation, thereby advantageously extending the useful operating lifetime of the wireless sensor 40.

Referring back to FIGS. 2 and 4, the controller 28 in some embodiments includes an antenna 72 such that the controller 28 is operable to transmit low-frequency AC power through the water 24 to the wireless sensor 40 for charging the wireless sensor 40. In such embodiments, the wireless sensor 40 can wirelessly receive electrical power directly from the controller 28 and/or indirectly from a wired-and-wireless sensor 70. In the embodiment shown in FIG. 2, the controller 28 is operable to switch power at the antenna 72 on or off using a switch 38, although other arrangements are possible. Typically, the antenna 72 is connected to the controller 28 by a cable 74, which may be a shielded cable 74 for example, such that the antenna 72 is disposed atop the membrane 14 within the area defined by the perimeter guard 54.

Figure 6:
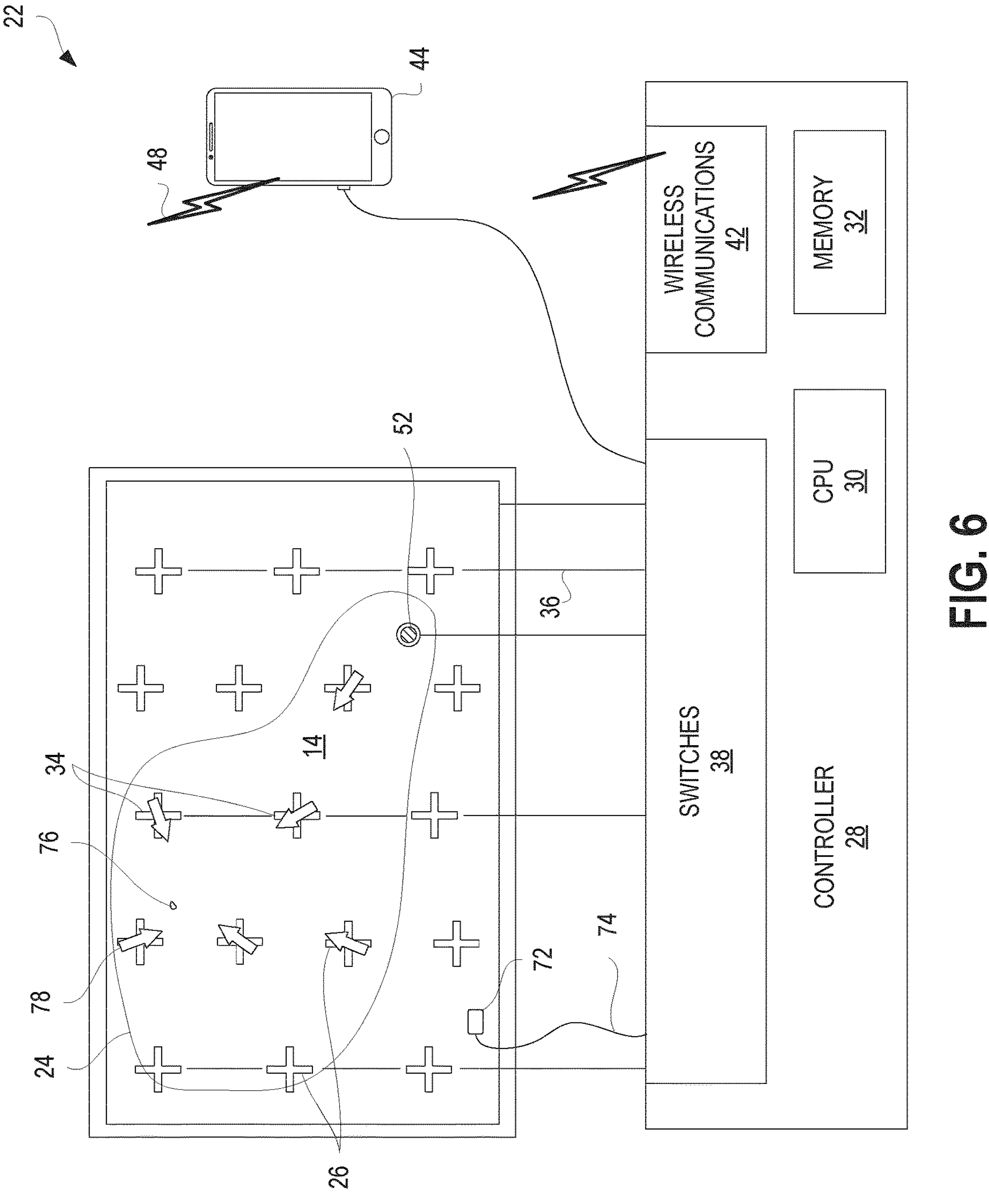
FIG. 6 is a block diagram and schematic representation of the system shown in FIG. 2, showing voltage vectors pointing toward a first leak in the building roof.

Referring to FIG. 6, the system 22 is operable to detect and locate water leaks through the membrane 14, such as the leak 76, by energizing at least one voltage source in contact with an electrically conductive fluid, such as the water 24 shown in FIG. 6, and determining a voltage differential between at least one pair of sensor pads that are not being energized. The energized voltage source(s) typically include any fixture guards 50 expected to be in contact with the water 24, the perimeter guard 54 typically expected to be in contact with the water 24, and any wired sensors 34 expected to be in contact with the water 24. Typically, the perimeter guard 54 and all wired sensors 34 and fixture guards 50 in contact with the water 24 are energized, then voltages are sequentially sensed at each non-energized sensor 26, including by temporarily de-energizing a given wired sensor 34 in order to sense its sensor pad 58 voltages.

In the first embodiment, the selected voltage sources are energized by the controller 28 connecting to the selected voltage sources via the switches 38, electrically grounding the deck 12 (FIG. 1), and then applying a DC voltage to the voltage sources relative to the electrically grounded deck 12. Energizing the voltage sources in turn energizes the water 24 and causes an electrical current to flow through the leak 76 to the deck 12. By measuring the voltage at a number of sensor pads 58 of sensors 26 when each such sensor pad 58 is not being energized, the controller 28 is operable to determine a number of voltage vectors 78 as differences between voltages at a pair or group of sensor pads 58, thereby providing a number of indicators of the direction toward the leak 76. For example, the controller 28 in some embodiments compares the voltage at each of the sensor pads 58 of a given sensor 26, which may be a sensor 34, 40 or 70 in this example, not being energized when voltage is being sensed at its sensor pads 58, to determine a single voltage vector 78 associated with that sensor 26 and directed toward the leak 76, if any. Convergence of the directions indicated by a number of voltage vectors 78 from different sensors 26 to a single point on the membrane 14 locates the leak 76 at that single point.

FIG. 6 shows a portion only of the membrane 14 being covered by the water 24 to allow an electric current to flow from any energized voltage sources to the leak 76, and through the leak 76 to the electrically grounded deck 12. As shown in FIG. 6, such portion encompasses the leak 76 and a number of sensors 26. The fixture guard 50 in contact with the water 24, when energized by the controller 28, ensures that the voltage vectors 78 associated with sensors 26 close to the drain fixture 52 point toward the leak 76 instead of pointing toward the drain fixture 52.

As can be clearly seen from FIG. 6, the inclusion of wireless sensors 40 advantageously increases the precision of the leak 76 detection capability of the system 22 without the additional burden of increasing the number and/or length of the wires 36.

Figure 7:
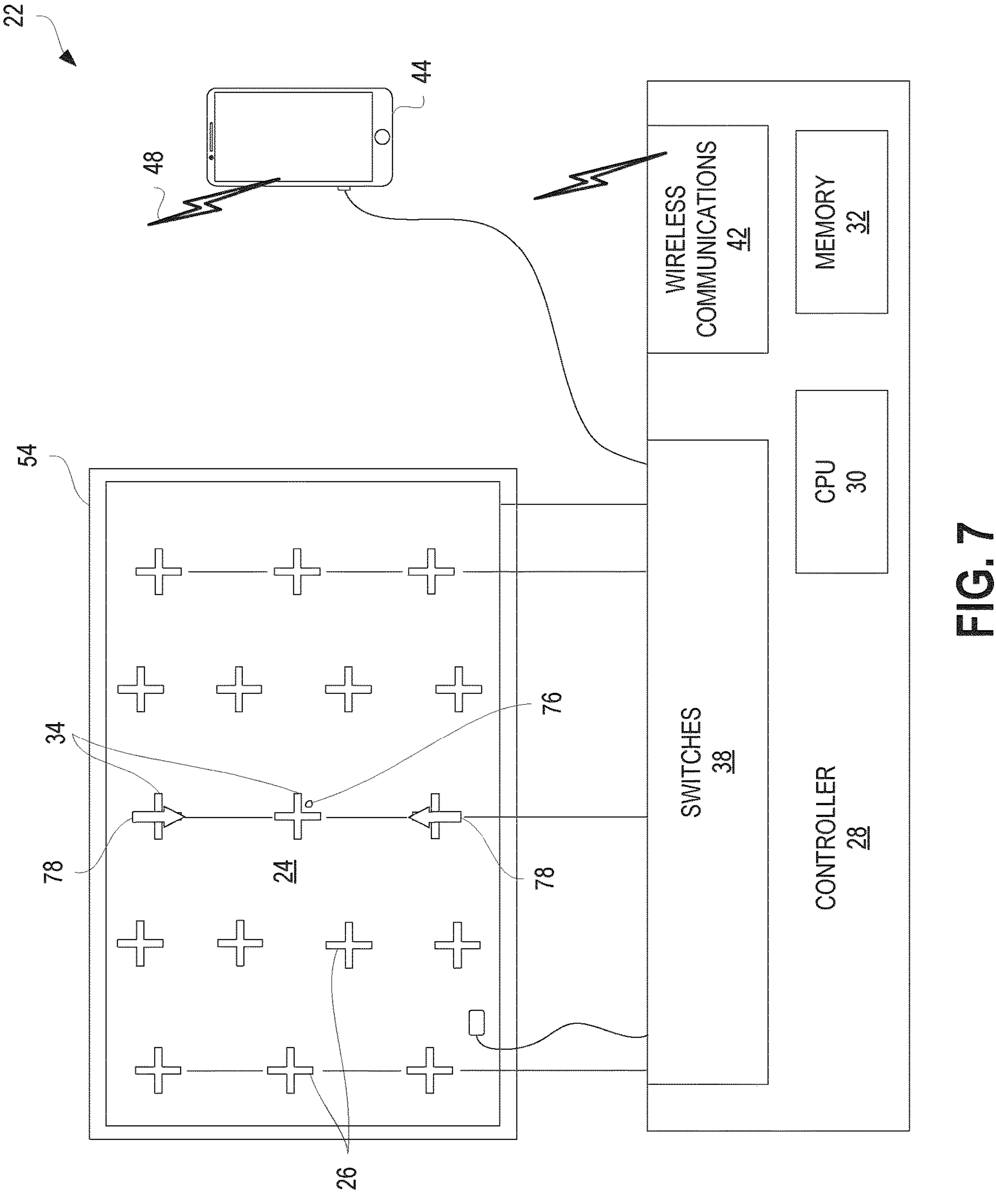
FIG. 7 is a block diagram and schematic representation of the system shown in FIG. 2, showing a second leak very close to one wired sensor.
Figure 8:
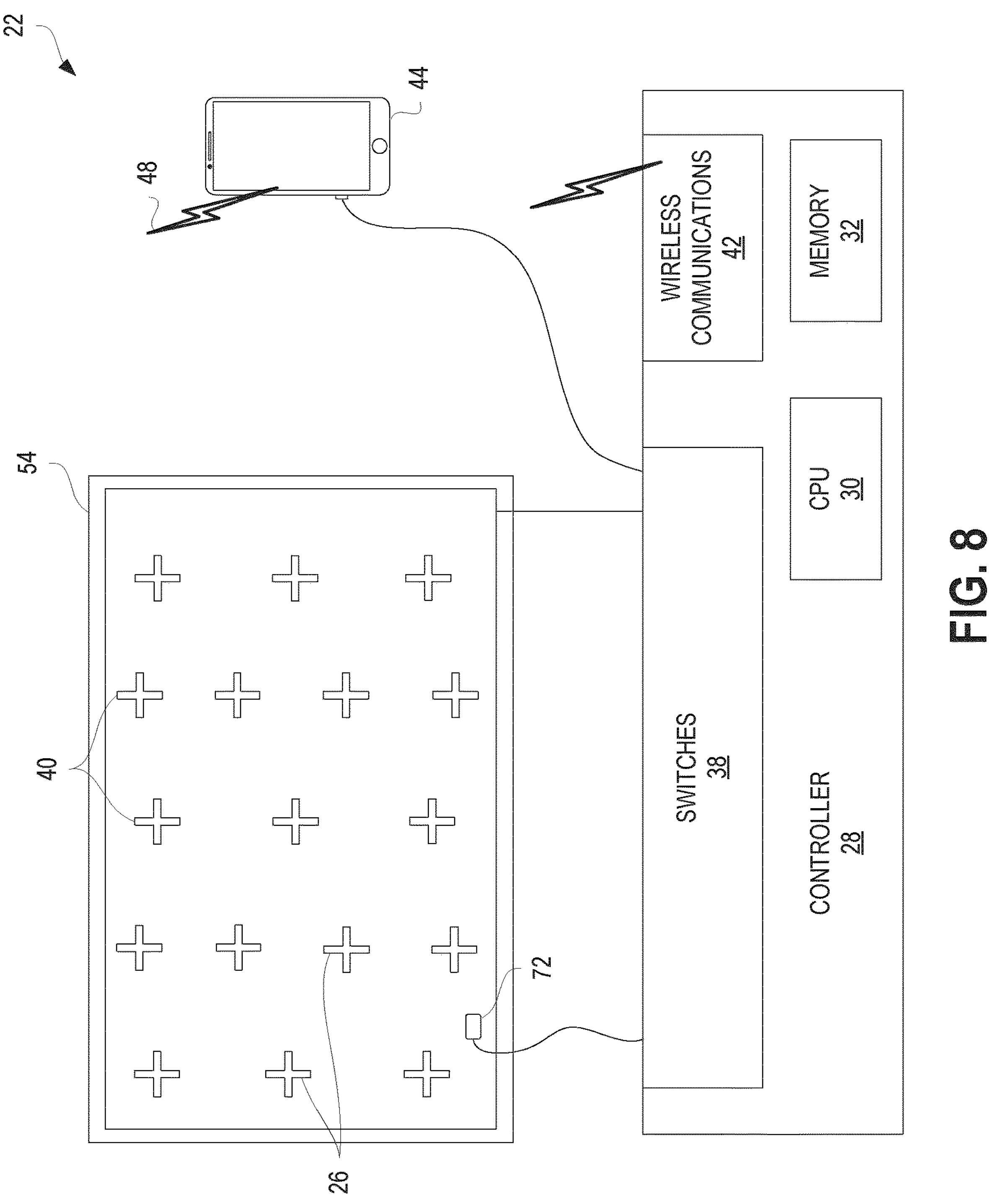
FIG. 8 is a block diagram and schematic representation of the system shown in FIG. 2, showing the system employing only wireless sensors.

FIG. 7 shows the system 22 in circumstances in which a water leak 76 is located very close to one specific wired sensor 34. In such circumstances, energizing that specific wired sensor 34 can obscure the location of the leak 76 when attempts are made to detect the leak 76 by sensing voltages at other sensors 26. Such obscuration may occur, for example, whenever the leak 76 happens to be within the sphere of electrical influence of the energization of a given wired sensor 34 or 70. For the exemplary set-up shown in FIG. 7, the water 24 is present everywhere within the boundary defined by the perimeter guard 54.

To locate the leak 76 of FIG. 7, the controller 28 de-energizes more than one sensor 26 at the same time and perform measurements at one of the non-energized sensors 26 while at least one wired sensor 34 is neither energized nor being used for sensing a measurement. Typically, pairs of adjacent and non-energized sensors 26 that include at least one wired sensor 34 are defined by the system 22 in order to locate a leak 76 that is too close to a given wired sensor 34. For example, if de-energizing one wired sensor 34 at a time produces inconclusive results from a number of voltage vectors 78, then adjacent pairs of wired sensors 34, for example, can be de-energized and a voltage vector 78 determined at one of the wired sensors 34 while the other wired sensor 34 remains de-energized. The additional voltage vectors 78 gathered by sequencing through a number of adjacent pairs of wired sensors 34 can advantageously locate a leak 76 that might otherwise have been obscured by the energization of all of the wired sensors 34.

In the example shown by FIG. 7, the wired sensor 34 closest to the leak 76 is de-energized such that the voltage vectors 78 determined at adjacent wired sensors 34 correctly point toward the leak 76. To further confirm the results shown in FIG. 7, further voltage vectors 78 can be determined at other sensors 26 while the specific wired sensor 34 suspected to be closest to the leak 76 remains de-energized.

Referring particularly to FIGS. 2 to 5 and 8, in some embodiments there are no wired sensors 34, no wired-and-wireless sensors 70, and only wireless sensor(s) 40. In such embodiments, the controller 28 energizes the perimeter guard 54 relative to the electrically grounded deck 12 (FIG. 1) in order to create an electrical current through any existing leak(s) 76. Also, fixture guards 50 circumscribing fixtures such as drains, if any, are also energized. Additionally or alternatively, in embodiments in which the antenna 72 is present, the controller 28 is operable to energize the antenna 72 with a DC voltage for leak detection purposes, simultaneously or instead of controlling the antenna 72 for charging the wireless sensors 40 and/or communicating with the wireless sensors 40. Wireless communication to and/or from each wireless sensor 40 can be performed by the controller 28 and/or the handheld communications device 44, for example.

Thus, there is provided a system for monitoring moisture at a structural component, the structural component comprising a membrane for fluid impermeability and a deck for supporting the membrane at a first side of the membrane opposite a second side of the membrane, the system comprising: (a) a plurality of sensors spaced apart from each other adjacent to the membrane at the second side, the plurality of sensors comprising one or more wireless sensors, each said sensor comprising a plurality of sensor conductors and a connection member connecting the plurality of sensor conductors to each other while electrically insulating said sensor conductors from each other; and (b) a controller operable to selectively communicate wirelessly with said each wireless sensor, and operable to selectively determine a sensor output from said each sensor.

Method of Operation

Figure 9:
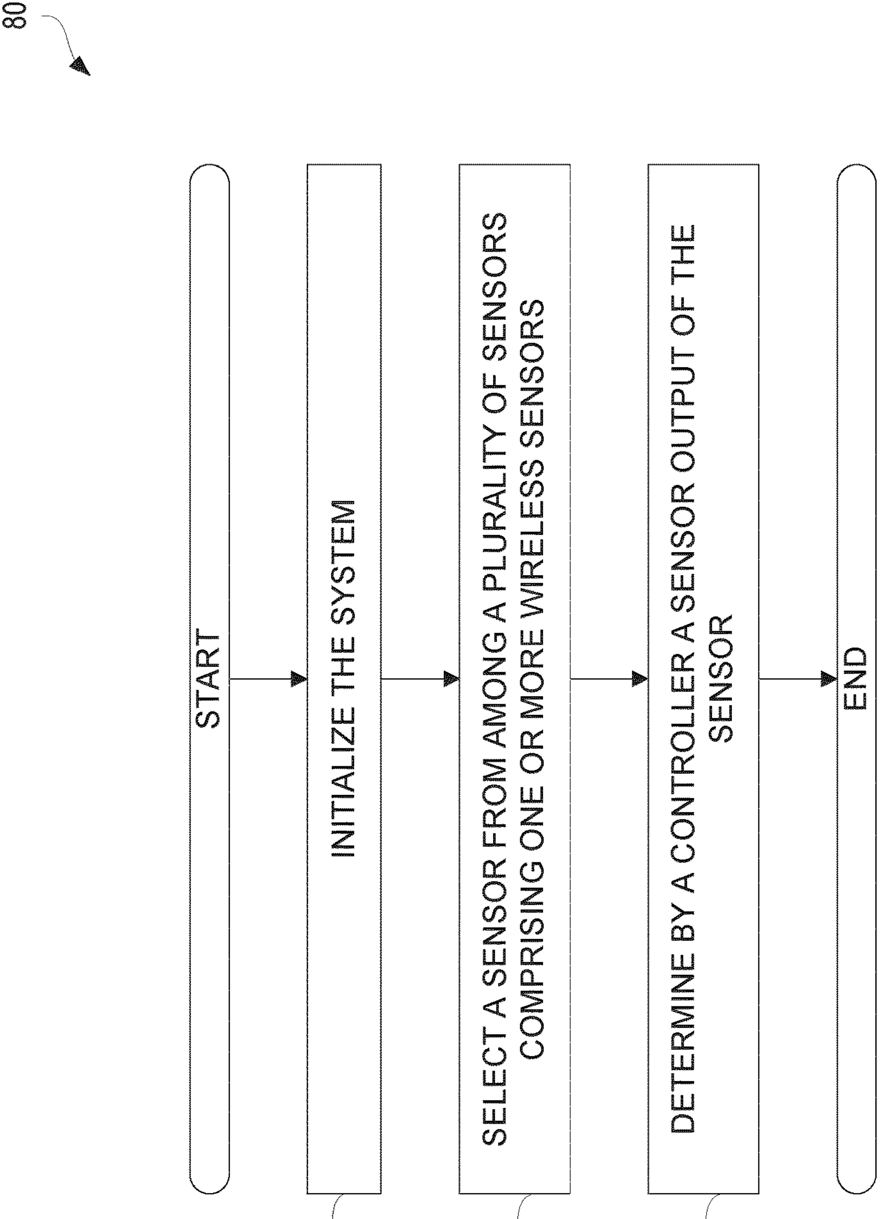
FIG. 9 is a flow diagram of a method of monitoring moisture at the structural component according to embodiments of the invention.

Referring to FIG. 9, the memory 32 in accordance with the first embodiment of the invention contains blocks of code comprising computer executable instructions for directing the CPU 30 to perform the steps of a method shown generally at 80. Additionally or alternatively, such blocks of code may form part of a computer program product comprising computer executable instructions embodied in a signal bearing medium, which may be a recordable computer readable medium or a signal transmission type medium, for example.

When electrical power is being supplied to the CPU 30 and the memory 32, the CPU 30 is directed to begin executing the instructions of block 82. Block 82 then directs the CPU 30 to initialize the system 22 (FIG. 2). Once initialized, block 84 then directs the CPU 30 to select a sensor from among a plurality of sensors comprising one or more wireless sensors. In variations of embodiments, selecting a sensor 26 involves selecting from among the wired sensor 34, wireless sensor 40, and/or wired-and-wireless sensor 70. For example, each sensor 26 of the system 22, or a group of sensors 26, may be sequentially selected from all sensors 26 of the system 22 or a subset thereof. In the first embodiment, the sensors 26 include at least one wireless sensor 40. Selecting a sensor 26 typically involves the controller 28 connecting to one or more sensor pads 58 of the desired sensor 26 via the switches 38 of the controller 28. After a given sensor 26 has been selected, the process continues to block 86. Block 86 directs the CPU 30 to determine, by a controller, a sensor output of the currently selected sensor. In the first embodiment, the controller 28 determines the output of the selected sensor 26, such as by sensing the voltage at one or more sensor pads 58 of the selected sensor 26. After the block 86 has been executed, the method 80 ends. In various embodiments, the method 80 or portions thereof may be iterated any number of times.

While sensing voltage at a sensor pad 58 is one example, other measurements are possible, such as measuring resistance as described herein below.

Resistance Measurements

In various embodiments of the invention, the system 22 is operable to measure the electrical resistance between various components of the system 22. Typically, resistance between pairs of sensor pads 58 is measured. Low resistance between two given sensor pads 58 typically indicates that there is a sufficient amount of water 24 present between the two given sensor pads 58.

Figures 10, 11, 12:
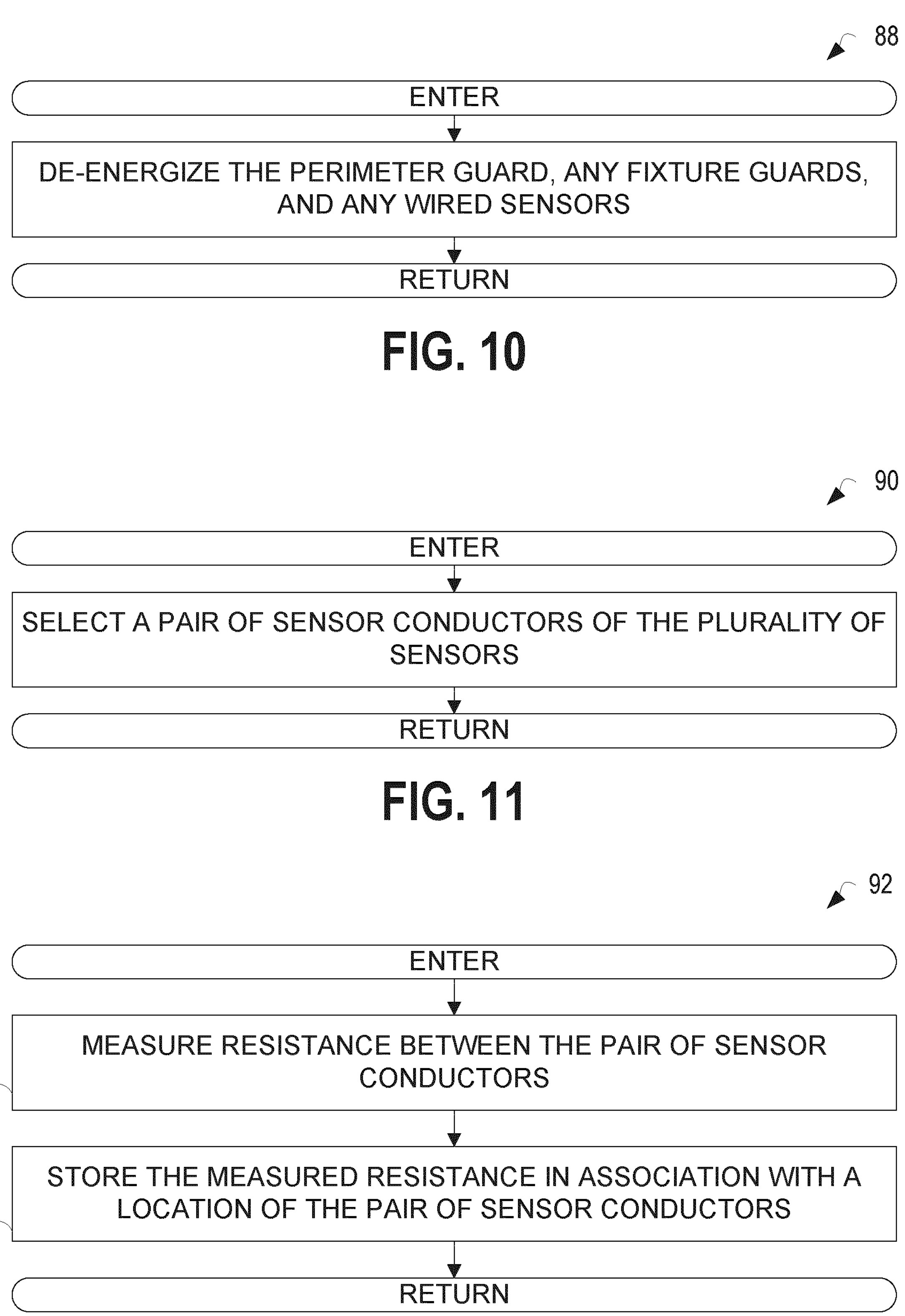
FIG. 10 is a flow diagram of a method of performing a first step of the method shown in FIG. 9, for a resistance measurement.
FIG. 11 is a flow diagram of a method of performing a second step of the method shown in FIG. 9, for the resistance measurement.
FIG. 12 is a flow diagram of a method of performing a third step of the method shown in FIG. 9, for the resistance measurement.

Referring to FIG. 10, an exemplary method for directing the CPU 30 to perform steps of block 82 (FIG. 9) is shown at 88. By method 88, the CPU 30 is directed to de-energize the perimeter guard 54, any fixture guards 50, and any wired sensors 34 of the system 22. The various energizable components of the system 22 not participating in the resistance measurement do not need to be energized for such resistance measurements to occur, and de-energizing such energizable components avoids interfering with resistance measurements. Other system 22 initialization steps may also be taken. After method 88 has been executed, the CPU 30 is directed to return to block 84 of FIG. 9.

Referring to FIG. 11, an exemplary method for directing the CPU 30 to perform steps of block 84 (FIG. 9) is shown at 90. By method 90, the CPU 30 is directed to select a pair of sensor conductors of the plurality of sensors. In various embodiments, a pair of sensor pads 58 is selected. Pairs of sensor pads 58 within the same sensor 26, or sensor pads 58 from different sensors 26 may be selected, for example. In some embodiments, a routine of sequentially selecting pairs of sensor pads 58 is performed. Additionally or alternatively, pairs of sensor pads 58 may be randomly selected, for example. Selecting a pair of sensor pads 58 typically involves the controller 28 connecting to the selected pair of sensor pads 58 via its switches 38. After method 90 has been executed, the CPU 30 is directed to return to block 86 of FIG. 9.

Referring to FIG. 12, an exemplary method for directing the CPU 30 to perform steps of block 86 (FIG. 9) is shown generally at 92. Method 92 begins execution at block 94, which directs the CPU 30 to measure resistance between the pair of sensor conductors. In the first embodiment, the controller 28 measures resistance between the currently connected pair of sensor pads 58. Thereafter, block 96 directs the CPU 30 to store the measured resistance in association with a location of the pair of sensor conductors. In the first embodiment, the CPU 30 is directed to store the measurement data in the memory 32, such as in a relational database. The resistance data is typically also stored in association with the date and time, and in some embodiments may be stored in association with meteorological data such as rainfall or other precipitation, humidity, other weather-related data, or any combination thereof for example. After block 96 has been executed, the CPU is directed to return to end the method 80.

In variations, one or more of the methods 88 to 92 may be iterated any number of times. In some embodiments, the methods 90 and 92 are iterated for a number of different pairs of sensor pads 58 to determine a map of locations on the building roof 10 (FIG. 1) where the water 24 is prevalent. Such map can be stored in memory 32 in association with the date and time and, in some embodiments, in association with meteorological data. Execution of the method 80 for resistance measurements may be repeated periodically for longterm tracking of areas on the building roof 10 where natural rainwater tends to be prevalent. Determination of areas of frequent water pooling can advantageously provide an early warning of potential leaks on the building roof 10.

An alarm or other system 22 output based on the prevalence of natural rainwater pooling on the building roof 10 advantageously assists the decision, either manual or automated, to conduct further testing.

Leak testing typically involves wetting the surface of the building roof 10 and testing for electrical conductivity between the membrane 14 at its upper side 18 and the deck 12 adjacent the lower side 16 of the membrane 14. After wetting the membrane 14 surface at its upper side 18, but prior to leak testing, it may be advantageous to perform resistance measurements to determine whether the upper side 18 of the membrane 14 is sufficiently wetted for leak testing within a specifiable area of the roof 10. Accordingly, the methods 88 to 92 may advantageously be employed prior to leak testing, in respect of the entire roof 10 or merely areas of interest for leak testing.

Voltage Calibration

After the membrane 14 at its upper side 18 has been sufficiently wetted for leak testing, as described herein above, it is advantageous to calibrate the fixture-guard voltage, perimeter-guard voltage, and the sensor-excitation voltage to be applied to the fixture guard 50, perimeter guard 54, and the wired sensors 34 and wired-and-wireless sensors 70, respectively.

Figures 13, 14:
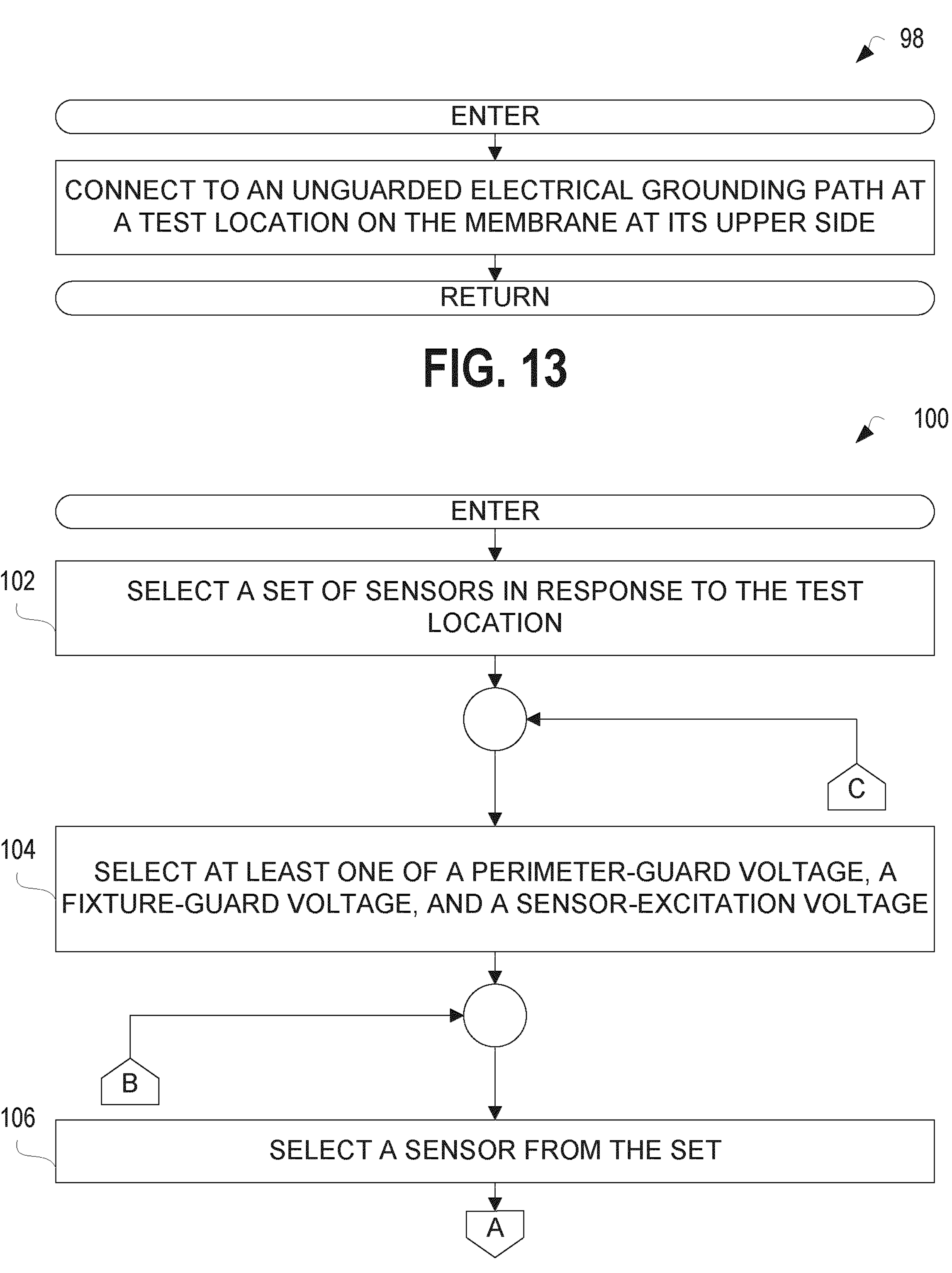
FIG. 13 is a flow diagram of a method of performing the first step of the method shown in FIG. 9, for a voltage calibration.
FIG. 14 is a flow diagram of a method of performing a first portion of the first and second steps of the method shown in FIG. 9, for the voltage calibration.

Referring to FIG. 13, an exemplary method for directing the CPU 30 to perform steps of block 82 (FIG. 9) is shown at 98. By method 98, the CPU 30 is directed to connect to an unguarded electrical grounding path at a test location on the membrane at its upper side. In the first embodiment, the controller 28 connects via its switches 38 to a previously determined component or point on the upper side 18 of the membrane 14 that is electrically grounded to the deck 12 and is not guarded by a fixture guard 50, perimeter guard 54, or the like. Typically, the unguarded electrical grounding path is selected as a drain fixture 52 or other fixture of the building roof 10 (e.g. parapet) that is electrically grounded to the deck 12. Alternatively, an artificial grounding point can be created by connecting one of the sensor pads 58 to electrical ground within the controller 28 via the switches 38. Also, an artificial grounding point can be created by connecting the antenna 72 (FIG. 2) via its cable 74 to a grounding point of the controller 28 via the switches 38 and a current-limiting resistance. Other unguarded electrical grounding paths are possible. In the first embodiment, the location of the grounded component or point on the upper side 18 of the membrane 14 is taken as the test location, such as by the controller 28 storing the location in the memory 32 for later retrieval and use. After the method 98 has been executed, the CPU 30 is directed to return to block 84 of FIG. 9.

Referring to FIG. 14, an exemplary method for directing the CPU 30 to perform combined steps of blocks 84 and 86 (FIG. 9) is shown at 100. Method 100 begins execution at block 102, which directs the CPU 30 to select a set of sensors in response to the test location. In the first embodiment, the CPU 30 is directed to select a set of sensors 26 that are typically within the vicinity of the test location. In some embodiments, all sensors 26 within a certain radius around the test location are selected, while in other embodiments a fixed number (e.g. 2, 4, 10, etc.) of sensors 26 closest to the test location are selected. Other selections are possible. Typically, the selection made by block 102 is stored in the memory 30 for later retrieval and use.

After block 102 has been executed, block 104 directs the CPU 30 to select at least one of a perimeter-guard voltage, a fixture-guard voltage, and a sensor-excitation voltage. In the first embodiment, the selection of voltage type to be calibrated is under user control via the controller 28. However, in some embodiments, all calibratable voltages are calibrated with each calibration. In circumstances in which all voltage types are being calibrated, then the CPU 30 is directed to select the perimeter-guard voltage, the fixture-guard voltage, and the sensor-excitation voltage. In a variation of embodiments, it is possible for different fixture guards 50 to use different voltage levels and for such different voltage levels to be separately calibrated. Also, it is possible for different sensors 26 to use different sensor-excitation voltages and for such different sensor-excitation voltages to be separately calibrated. Combinations thereof are also possible. Typically, the selection made by block 104 is stored in the memory 30 for later retrieval and use.

After block 104 has been executed, block 106 directs the CPU 30 to select a sensor from the set. In the first embodiment, the CPU 30 is directed to select one sensor 26 from the set selected by block 102. In general, the sensors 26 of the set can be selected in any order and are typically sequentially selected with each invocation of block 106. Selecting one sensor 26 typically involves the controller 28 connecting to the one sensor 26 via the switches 38. After block 106 has been executed, the process is directed to block 108 of FIG. 15.

Figure 15:
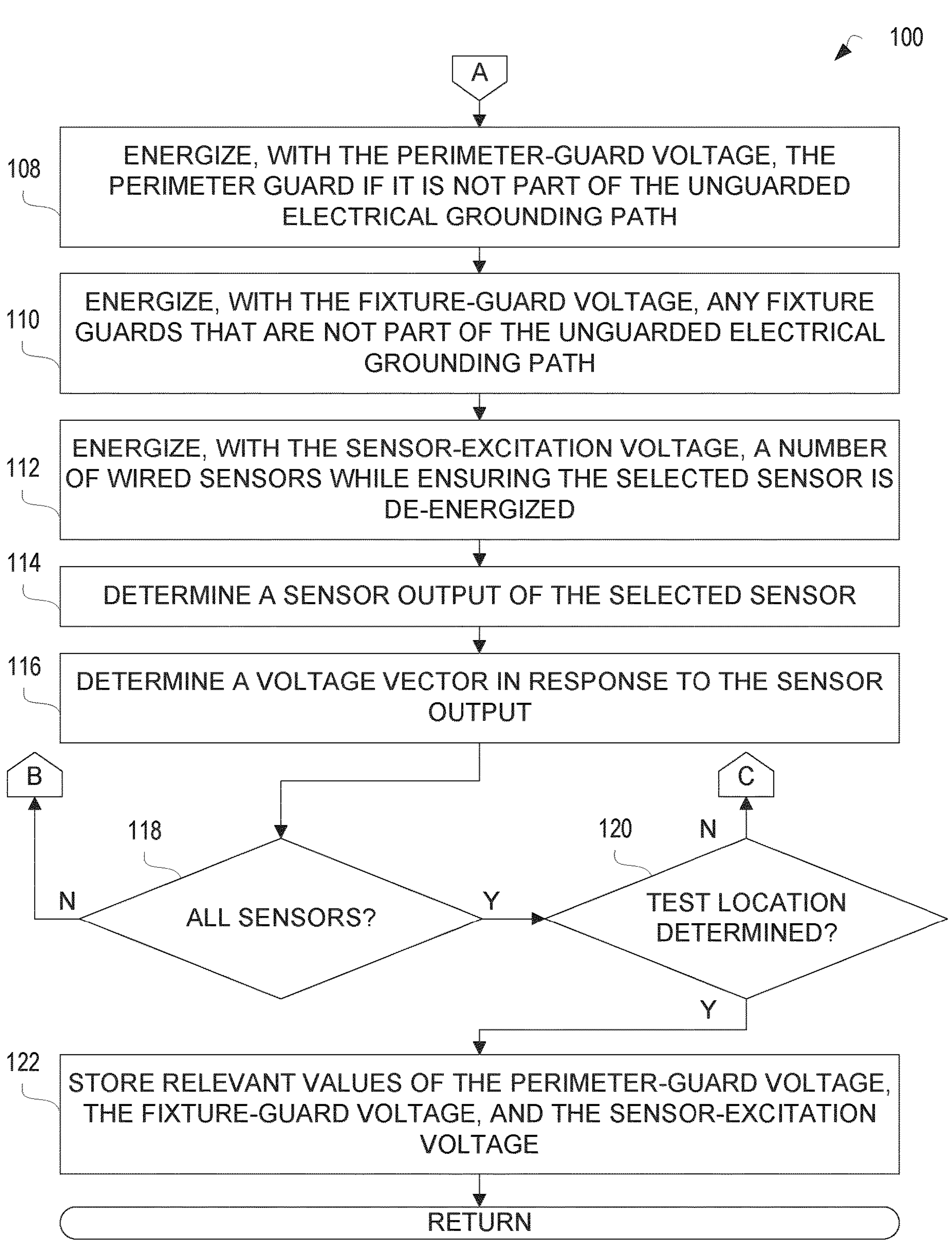
FIG. 15 is a flow diagram of a method of performing a second portion of the first and second steps of the method shown in FIG. 9, for the voltage calibration.

Referring to FIG. 15, block 108 directs the CPU 30 to energize, with the perimeter-guard voltage, the perimeter guard if it is not part of the unguarded electrical grounding path. In circumstances in which the controller 28 is not connected to the perimeter guard 54, by operation of block 98 of FIG. 13, so as to be part of the unguarded electrical grounding path, then by block 108 the controller 28 via its switches 38 energizes the perimeter guard 54 with the perimeter-guard voltage. For example, a previously stored value for the perimeter-guard voltage, such as a default value or a most-recently used value, may be employed. Typically, the perimeter-guard voltage is a DC voltage for electrifying the water 24 in contact with the perimeter guard 54.

Block 110 directs the CPU 30 to energize, with the fixture-guard voltage, any fixture guards that are not part of the unguarded electrical grounding path. Other than any fixture guard 50 being used for the unguarded electrical grounding path, all other fixture guards 50 are energized by the controller 28 via its switches 38 in the first embodiment. Typically, the fixture guards 50 are energized to each have a DC voltage equal to a previously stored value for the fixture-guard voltage, such as a default value or a most-recently used value for example. In embodiments in which different fixture guards 50 employ different fixture-guard voltages, the appropriate fixture-guard voltage is applied by the controller 28 to each corresponding fixture guard 50.

Block 112 directs the CPU 30 to energize, with the sensor-excitation voltage, a number of wired sensors while ensuring the selected sensor is de-energized. In the first embodiment, the CPU 30 is directed to energize all of the wired sensors 34 that are not part of unguarded electrical grounding path and are not the currently selected sensor 26 (see description of block 106 above). The sensor-excitation voltage typically has a previously stored value such as a default or most-recently used value. In embodiments in which different sensors 26 employ different sensor-excitation voltages, the appropriate sensor-excitation voltage is applied by the controller 28 to each corresponding sensor 26 or sensor 26 type.

While blocks 108 to 112 of FIG. 15 relate to circumstances in which all of the perimeter-guard voltage, fixture-guard voltage, and the sensor-excitation voltage are being calibrated, in some circumstances of some embodiments only a subset of such voltages are being calibrated such that only a corresponding subset of the blocks 108 to 112 are executed.

Block 114 directs the CPU 30 to determine a sensor output of the selected sensor. In the first embodiment, the controller 28, once it has been connected to the selected sensor 26 via the switches 38, senses the voltage at the selected sensor 26. In the first embodiment, determining the sensor 26 output involves the controller 28 sequentially sensing the voltage at one or more sensor pads 58 of the selected sensor 26. Typically, the voltages at all of the sensor pads 58 of the selected sensor 26 are sequentially sensed and their respective values stored in the memory 32.

Block 116 directs the CPU 30 to determine a voltage vector in response to the sensor output determined by block 114. In the first embodiment, the controller 28 determines a voltage difference between various pairs of the sensor pad 58 voltages, and then computes the voltage vector 78 to represent a direction from the selected sensor 26 toward the electrically grounded test location. Determining the voltage vector 78 typically also includes storing the determined voltage vector 78 in the memory 32 for later reference.

Block 118 directs the CPU 30 to determine whether all sensors 26 (of the set selected by block 102) have been selected (by block 106).

If the CPU 30 determines that not all of the sensors 26 have previously been selected such that further sensors 26 remain to be selected, then block 106 of FIG. 14 directs the CPU 30 to select the next sensor 26 in the set. Thereafter, blocks 108 to 116, or a portion thereof, of FIG. 15 are executed in respect of the newly selected sensor 26.

If the CPU 30 determines that all of the sensors 26 have been previously selected, then block 120 directs the CPU 30 to determine whether the test location has been determined. In the first embodiment, the controller 28 attempts to determine the test location on the basis of the voltage vector 78 data previously stored by block 116, which typically includes one voltage vector 78 for each sensor 26 of the set of sensors 26 determined by block 102 (FIG. 14). In the first embodiment, determining the test location involves linearly extrapolating the voltage vectors 78 in their indicated directions starting from their sensor 26 locations, respectively, and then locating a single point where all such extrapolations intersect. An exemplary single point of extrapolation can be viewed in FIG. 6 in which a number of voltage vectors 78 point toward the leak 76. When the CPU 30 has determined a single point consistently indicated by all of the voltage vectors 78, then block 120 directs the CPU 30 to compare the determined single point to the test location previously stored by method 98 of FIG. 13. If the determined single point and the previously stored test location match, then the test location has been determined in accordance with block 120.

Generally, if the perimeter-guard voltage, fixture-guard voltage, and the sensor-excitation voltage are adequately calibrated, then the system 22 is capable of determining the test location. However, uncalibrated or improperly calibrated voltages can lead to contradictory voltage vector 78 directions that do not converge onto a single point equal to the test location (previously stored by method 98). For example, a perimeter-guard voltage and/or a fixture-guard voltage that is too low can result in the electrically grounded fixtures, which are not located at the test location, being mistaken by the system 22 for the grounded test path. Also, sensor-excitation voltages that are too low can result the sensors 26 not being sufficiently close to the test location for the system 22 to be able to determine. On the other hand, a perimeter-guard voltage, fixture-guard voltage, or a sensor-excitation voltage that is too high can result in the test location becoming masked or hidden from the sensors 26 of the set of sensors 26 of block 102. Thus, multiple appearances of test locations, voltage vectors 78 pointing in contradictory directions, or a determined test location that is not equal to the previously stored correct test location produces an inconclusive determination of the test location.

If the CPU 30 determines by block 120 that the test location is not conclusively determined, then block 104 of FIG. 14 directs the CPU 30 to select at least one of a perimeter-guard voltage, fixture-guard voltage, and a sensor-excitation voltage. Selecting such voltages involves adjusting one or more previously tested voltages such that the system 22, through iterations of executing block 104, converges to adequately calibrated guard and excitation voltages.

If the CPU 30 determines by block 120 of FIG. 15 that the test location is correctly determined, then block 122 directs the CPU 30 to store relevant values of the perimeter-guard voltage, fixture-guard voltage, and the sensor-excitation voltage. In circumstances where only a subset of these voltages is being calibrated, only the newly determined subset need be updated in memory 30, for example. Thereafter, calibrated values for the guard and excitation voltages are available in memory 30 for later retrieval and use.

After block 120 has been executed, the method 100 returns to end the method 80.

In variations of embodiments, the calibration procedure of FIGS. 13 to 15 can be performed periodically and the calibration results (i.e. the calibrated voltages) can be stored in association with a date and possibly time at which the calibration occurred. In some embodiments, the system 22 is operable to determine a trend in changes over time of the calibration values and to output the trend. In some embodiments, the system 22 triggers an alert or alarm, in response to the determined trend, indicating a need for system 22 maintenance or repair for example.

Single-Sensor Measurement

After the membrane 14 at its upper side 18 has been sufficiently wetted for leak testing (see FIGS. 10 to 12) and the guard and excitation voltages have been calibrated (see FIGS. 13 to 15), as described herein above, the system 22 can be used to detect any leaks in the building roof 10.

Figure 16:
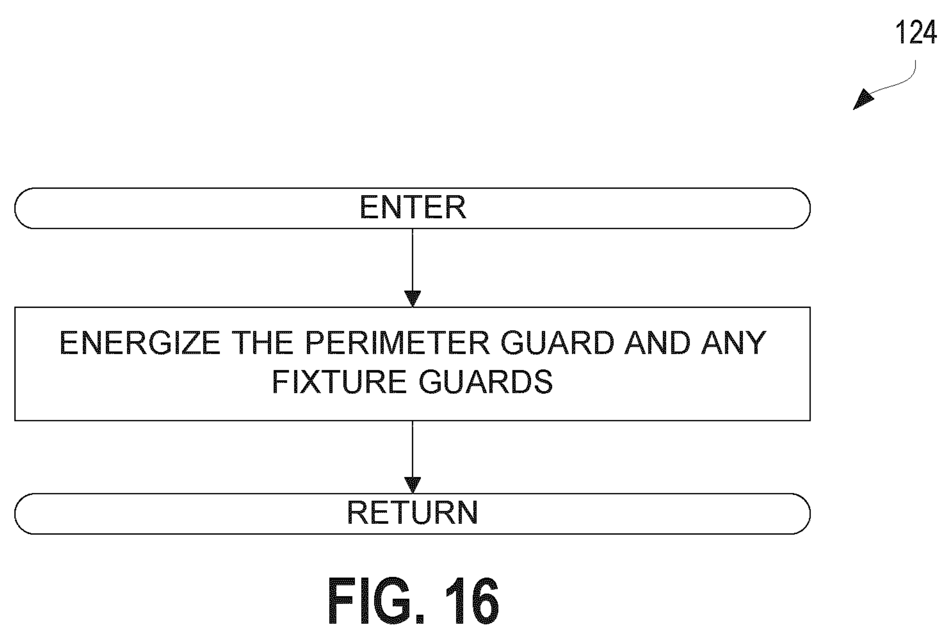
FIG. 16 is a flow diagram of a method of performing the first step of the method shown in FIG. 9, for a single-sensor measurement.

Referring to FIG. 16, an exemplary method for directing the CPU 30 to perform steps of block 82 (FIG. 9) is shown at 124. By method 124, the CPU 30 is directed to energize the perimeter guard and any fixture guards. In the first embodiment, the perimeter guard 54 is energized at its previously determined perimeter-guard voltage, which may be a previously stored default value or a previously stored calibrated value. Similarly, any fixture guard(s) 50 that are present are energized at the one or more previously determined fixture-guard voltages, which may be previously stored default value(s) or previously stored calibrated value (s). Energizing the perimeter guard 54 and the fixture guard(s) 50 typically involves connecting the perimeter guard 54 and the fixture guard(s) 50 via the switches 38 to DC voltage sources (not shown) of the controller 28. After the method 124 has been executed, the CPU 30 is directed to return to block 84 of FIG. 9.

Figure 17:
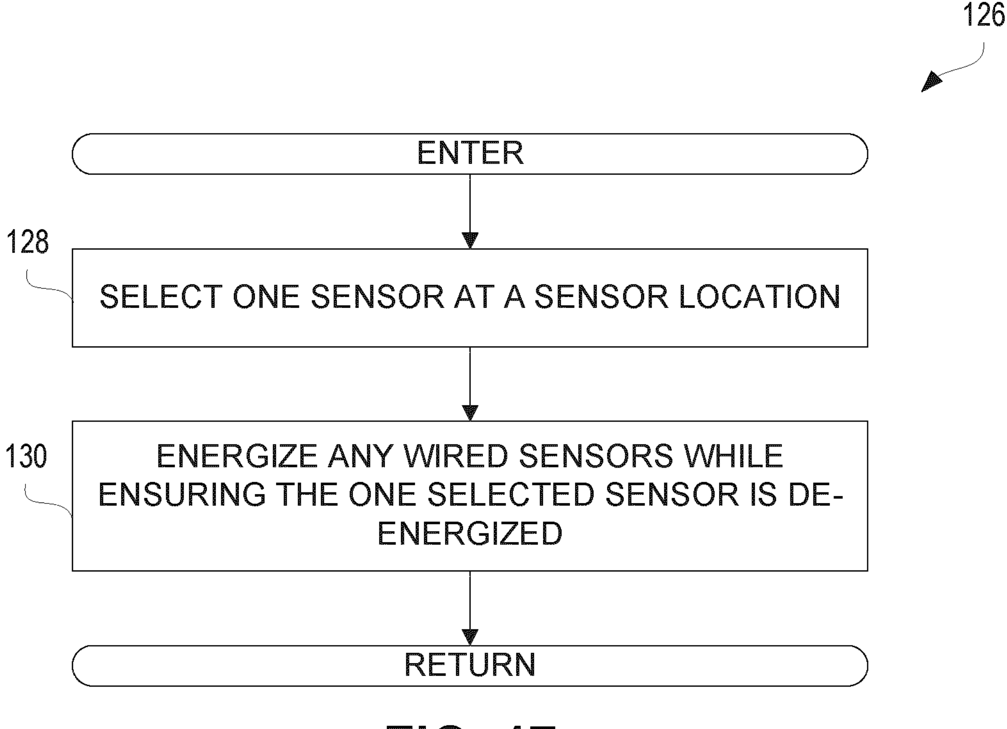
FIG. 17 is a flow diagram of a method of performing the second step of the method shown in FIG. 9, for the single-sensor measurement.

Referring to FIG. 17, an exemplary method for directing the CPU 30 to perform steps of block 84 (FIG. 9) is shown generally at 126. Method 126 begins execution at block 128, which directs the CPU 30 to select one sensor at a sensor location. In the first embodiment, the CPU 30 selects one sensor 26 for which in memory 32 there is stored an associated location on the building roof 10. The selection of the sensor 26 is then stored in the memory 32 in association with that sensor's associated location.

Block 130 directs the CPU 30 to energize any wired sensors while ensuring the one selected sensor is de-energized. In the first embodiment, all of the wired sensors 34 and the wired-and-wireless sensors 70 are energized at the sensor-excitation voltage, except that the sensor 26 previously selected by block 128 is not energized even if it is a wired sensor 34 or a wired-and-wireless sensor 70. Energizing a sensor 26 typically involves connecting its wire(s) 34 to a DC voltage source (not shown) of the controller 28 via the switches 38. In the first embodiment, the selected sensor 26 remains de-energized after block 130 has been executed. After block 130 has been executed, the method 126 returns to block 86 of FIG. 9.

Figure 18:
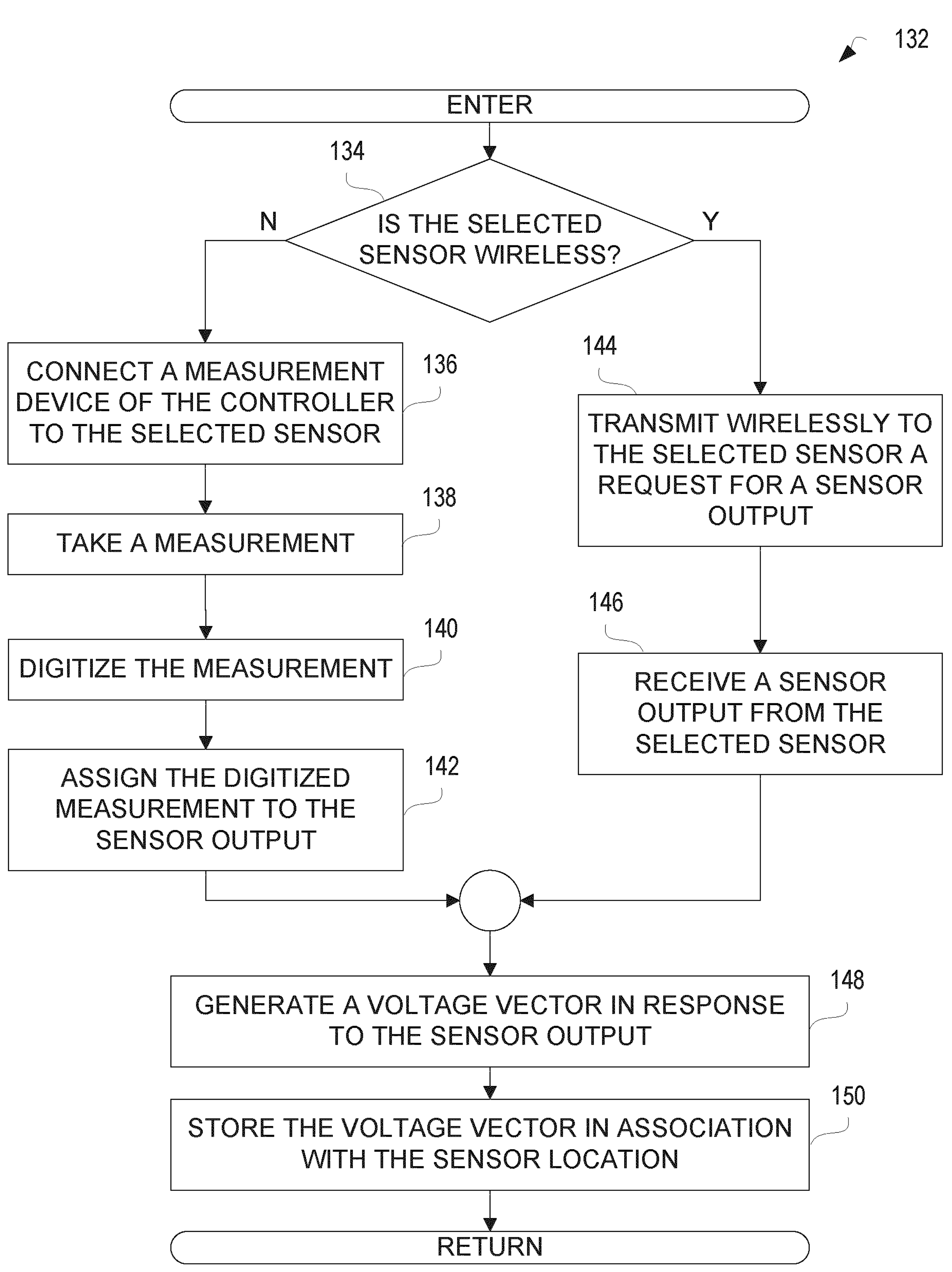
FIG. 18 is a flow diagram of a method of performing the third step of the method shown in FIG. 9, for the single-sensor measurement.

Referring to FIG. 18, an exemplary method for directing the CPU 30 to perform steps of block 86 (FIG. 9) is shown generally at 132. Method 132 begins execution at block 134, which directs the CPU 30 to determine whether the selected sensor is wireless. In the first embodiment, the CPU 30 is directed to determine whether the sensor 26 selected by block 128 of FIG. 17 is a wireless sensor 40, as opposed to a wired sensor 34 or a wired-and-wireless sensor 70. That is, block 134 determines whether the selected sensor 26 is a wireless-only sensor 40.

If the CPU 30 determines that the selected sensor 26 is not a wireless sensor 40, then block 136 directs the CPU 30 to connect a measurement device of the controller to the selected sensor. In the first embodiment, the selected sensor 26 is connected via its wire(s) 36 and the switches 38 to a voltage measurement device (not shown) of the controller 28.

Block 138 directs the CPU 30 to take a measurement. In the first embodiment, the controller 28 senses the voltage at a sensor pad 58 of the selected sensor 26, and typically sequentially senses the voltages at each sensor pad 58 of the selected sensor 26. In some embodiments, the controller 28 may include multiple voltage measurement devices that can simultaneously sense the voltages at all of the sensor pads 58 of the selected sensor 26. In the first embodiment, the sensed voltage is an analog DC voltage.

Block 140 directs the CPU 30 to digitize the measurement. In the first embodiment, the voltage measurement device(s) include an analog-to-digital converter for converting the analog DC voltage to a digital value.

Block 142 directs the CPU 30 to assign the digitized measurement to the sensor output. In the first embodiment, the digitized measurement value(s) are stored in the memory 32 in association with the identity of the selected sensor 26.

After block 142 has been executed, further steps are performed as described herein below.

If by block 134 the CPU 30 determines that the selected sensor 26 is a wireless sensor 40 (i.e. that it is neither a wired sensor 34 nor a wired-and-wireless sensor 70), then block 144 directs the CPU 30 to transmit wirelessly to the selected sensor a request for a sensor output. In variations of embodiments, the controller 28 is operable to wirelessly transmit a request to a wireless sensor 40 via its wireless communications module 42, via a handheld communications device 44, or via any one wired-and-wireless sensor 70. In some embodiments, the controller 28 is operable to select a manner of wireless communications based on the location of the selected wireless sensor 40, the relative location(s) and availability of handheld communications device(s) 44, the relative location(s) of any wired-and-wireless sensor(s) 70, other factors, and any combination thereof for example.

Block 146 directs the CPU 30 to receive a sensor output from the selected sensor. In the first embodiment, each wireless sensor 40 includes a transponder 68 operable to sense the analog voltages at its sensor pads 58, to digitize the sensed analog voltages, and to wirelessly transmit the digitized values as an output of the selected wireless sensor 40. The controller 28 typically wirelessly receives the sensor 40 output using the same wireless technique as was employed to the transmit the request for the sensor output.

Whether or not the selected sensor 26 is a wireless sensor 40, after either block 142 or 146 has been executed, block 148 directs the CPU 30 to generate a voltage vector in response to the sensor output. In the first embodiment, generating the voltage vector 78 associated with a selected sensor 26 involves determining voltage differences between various pairs of sensor pads 58 of the selected sensor 26 and computing a single vector representative of the direction from the selected sensor 26 toward electrical ground. In some embodiments, it is not the controller 28 that generates the voltage vector 78, but rather the selected sensor 26 itself that generates the voltage vector 78. For example, the transponder 68 of the wireless sensor 40 in some embodiments is operable to generate the voltage vector 78.

Block 150 directs the CPU 30 to store the voltage vector in association with the sensor location. In the first embodiment, the voltage vector 78 is stored in the memory 32 in association with the location of the selected sensor 26 from which the voltage vector 78 was generated. After block 150 has been executed, the CPU 30 is directed to return to end the method 80 of FIG. 9.

For ease of illustration, FIGS. 16 to 18 show an exemplary method of generating one voltage vector 78 associated with one selected sensor 26. In the first embodiment, the methods 126 and 132 are repeated for different sensors 26 selected by block 128 until a desired set of voltage vectors 78 have been generated and stored by blocks 148 and 150. Any number of sensors 26 of any type may be included in the set of sensors 26. Typically, all the sensors 26 within a desired test area, such as an area on the membrane 14 previously determined by periodic iterations of the methods of FIGS. 10 to 12 to be subjected to frequent pooling of the water 24, are included in the set of sensors 26. The sensors 26 are typically selected by block 128 of FIG. 17 sequentially and may be selected in any order.

After a number of voltage vectors 78 have been iteratively generated by the methods of FIGS. 16 to 18, block 150, in addition to storing the most recently generated voltage vector 78, directs the CPU 30 to determine whether the generated and stored voltage vectors 78 conclusively indicate one or more locations of leak(s) 76. In the first embodiment, determining whether the location of a leak 76 has been conclusively determined proceeds in a manner previously described in respect of block 120 of FIG. 15 herein above. If a number of voltage vectors 78 consistently point toward a single point on the upper side 18 of the membrane 14, then the system 22 has located a leak 76 (FIG. 6). If more than one leak 76 is present on the roof 10, determining all of the leaks 76 that are present involves dividing the stored voltage vectors 78 into groups depending on consistency of intersecting extrapolations from such voltage vectors 78. Thus, block 150 directs the CPU 30 to group the voltage vectors 78 for maximum consistency in locating one or more leaks 76. The CPU 30 is then directed to output the leak 76 locations that were determined by the methods of FIGS. 16 to 18. The output can be presented in any suitable manner, such as by graphic presentation, textual information, triggering an alert or an alarm, and the like for example.

Dual-Sensor Measurement

If the methods of FIGS. 16 to 18 do not conclusively determine a given leak 76, the system 22 may conclude that no leak 76 is present on the building roof 10. Additionally or alternatively, in some embodiments the CPU 30 is directed to perform dual-sensor measurements. Such dual-sensor measurements are particularly useful when a leak 76 happens to be located very close to one of the wired sensors 34 or 70 such that the energization of the wired sensor 34 or 70 masks the location of the leak 76 from being sensed by the other sensors 26.

Referring to FIG. 9, the dual-sensor measurement involves executing blocks 82 to 86.

Referring to FIG. 16 as previously described herein above, the method 124 is an exemplary method for performing steps of block 82 (FIG. 9) according to the dual-sensor measurement.

Figure 19:
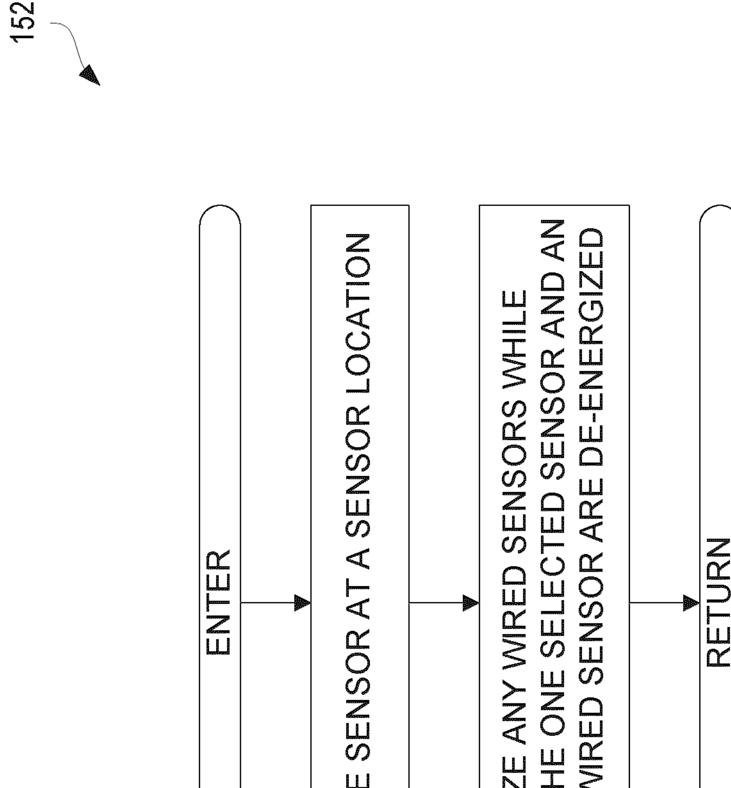
FIG. 19 is a flow diagram of a method of performing the second step of the method shown in FIG. 9, for a dual-sensor measurement.

Referring to FIG. 19, an exemplary method for directing the CPU 30 to perform steps of block 84 (FIG. 9) is shown generally at 152. The method 152 begins execution at block 154, which directs the CPU 30 to select one sensor at a sensor location. In the first embodiment, block 154 proceeds in the same manner as previously described herein in respect of block 128 (FIG. 17). After block 154 has been executed, the CPU 30 is directed to execute block 156.

Block 156 directs the CPU 30 to energize any wired sensors while ensuring the one selected sensor and an adjacent wired sensor are de-energized. In the first embodiment, block 156 proceeds in a manner analogous to that of block 130 (FIG. 17), except that at least one additional wired sensor 34 or 70 is de-energized. Typically, the additionally de-energized wired sensor 34 or 70 is adjacent to the sensor 26 selected by block 154 for measurement. However, in general any relationship, including random selection, between the additional wired sensor 34 or 70 and the selected sensor 26 may be employed. In some embodiments, a given wired sensor 34 or 70 is selected for de-energization and then each of its closest surrounding sensors 26 are sequentially selected for measurement, thereby permitting the system 22 to determine any leak 76 located very close to the given wired sensor 34 or 70. After block 156 has been executed, the CPU 30 is directed to return to block 86 of FIG. 9.

Referring to FIG. 18 as previously described herein above, the method 132 is an exemplary method for performing steps of block 86 (FIG. 9) according to the dual-sensor measurement. By the method 132, any leak 76 located very close to the adjacent wired sensor 34 of 70 de-energized by block 156 (FIG. 19) will be pointed to by the voltage vector 78 generated and stored by blocks 148 and 150.

In the first embodiment, the methods of FIGS. 19 and 18 are iterated for different combinations of selected sensors 26 and adjacent wired sensors 34 or 70 until a number of voltage vectors 78 are generated and stored by blocks 148 and 150. Thereafter, as previously described herein above, block 150 directs the CPU 30 to determine the location of one or more leaks 76 present on the building roof 10. After block 150 has been executed, the CPU 30 is directed to return to end the method 80 of FIG. 9.

Thus, there is provided a method of monitoring moisture at a structural component comprising a membrane for fluid impermeability and a deck for supporting the membrane at a first side of the membrane opposite a second side of the membrane, the method comprising: (a) selecting a first sensor from among a plurality of sensors spaced apart from each other adjacent to the membrane at the second side when the plurality of sensors comprise one or more wireless sensors and when each said sensor comprises a plurality of sensor conductors and a connection member connecting the plurality of sensor conductors to each other while electrically insulating said sensor conductors from each other; and (b) determining a sensor output from said first sensor by a controller operable to selectively communicate wirelessly with said each wireless sensor.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

What is claimed is:

1. A system for monitoring moisture at a structural component, the structural component comprising a membrane for fluid impermeability and a deck for supporting the membrane at a first side of the membrane opposite a second side of the membrane, the system comprising:

(a) a plurality of sensors spaced apart from each other adjacent to the membrane at the second side, the plurality of sensors comprising one or more wireless sensors, each of said one or more wireless sensors comprising a plurality of sensor conductors and a connection member comprising one or more arms connecting the plurality of sensor conductors to each other while electrically insulating said sensor conductors from each other, said each wireless sensor further comprising a transceiver physically attached to said one or more arms; and (b) a controller operable to selectively communicate wirelessly with said each wireless sensor, and operable to selectively determine a sensor output from each sensor of the plurality of sensors.

2. The system of claim 1 wherein said one or more arms comprises a plurality of said arms projecting from a center of the connection member toward a plurality of arm ends, respectively, each said arm end having attached thereto one said sensor conductor.

3. The system of claim 2 wherein said each sensor comprises four said sensor conductors, said each arm projecting substantially at right angles to its adjacent said arms.

4. The system of claim 1 wherein said transceiver is a transponder for transmitting said sensor output in response to wirelessly receiving a request.

5. The system of claim 4 wherein said one or more wireless sensors comprises an antenna for wireless communications.

6. The system of claim 4 wherein said one or more wireless sensors comprises a charging coil for charging electrical circuitry of said one or more wireless sensors.

7. The system of claim 1 wherein said one or more wireless sensors comprises a battery-powered sensor comprising a battery.

8. The system of claim 1 wherein the plurality of sensors further comprises one or more wired sensors, the controller being operable to selectively energize each said wired sensor with a sensor-excitation voltage.

9. The system of claim 8 wherein said one or more wireless sensors comprises a chargeable sensor, at least one said wired sensor being operable to emit alternating current electrical power for transmission through an electrically conductive fluid adjacent the membrane at its second side so as to charge said chargeable sensor.

10. The system of claim 1 wherein the controller is operable to determine resistance between a pair of said sensor conductors, and to determine in response to a plurality of said resistances an area of the structural component associated with multiple occurrences of pooling of an electrically conductive fluid adjacent the membrane at its second side.

11. A method of monitoring moisture at a structural component comprising a membrane for fluid impermeability and a deck for supporting the membrane at a first side of the membrane opposite a second side of the membrane, the method comprising:

(a) selecting a first sensor from among a plurality of sensors spaced apart from each other adjacent to the membrane at the second side when the plurality of sensors comprises one or more wireless sensors, each of said one or more wireless sensors comprises a plurality of sensor conductors and a connection member comprising one or more arms connecting the plurality of sensor conductors to each other while electrically insulating said sensor conductors from each other, and when said each wireless sensor further comprises a transceiver physically attached to said one or more arms; and (b) determining a sensor output from said first sensor by a controller operable to selectively communicate wirelessly with said each wireless sensor.

12. The method of claim 11 wherein step (b) comprises the controller receiving said sensor output via wireless communications in response to wirelessly transmitting a request to said first sensor when said first sensor is one said wireless sensor.

13. The method of claim 11 further comprising wirelessly powering said first sensor.

14. The method of claim 11 further comprising wirelessly charging said first sensor.

15. The method of claim 14 wherein step (a) comprises selecting the first sensor when the plurality of sensors comprises one or more wired sensors, and wherein wirelessly charging said first sensor comprises causing at least one said wired sensor to emit alternating current electrical power for transmission through an electrically conductive fluid adjacent the membrane at its second side so as to charge said first sensor.

16. The method of claim 11 wherein step (a) comprises selecting the first sensor when the plurality of sensors further comprises one or more wired sensors, and wherein step (b) comprises determining said sensor output when the controller is operable to selectively energize each said wired sensor.

17. The method of claim 11 further comprising calibrating at least one of a perimeter-guard voltage, a fixture-guard voltage, and a sensor-excitation voltage.

18. The method of claim 17 further comprising energizing a set of said wired sensors with said sensor-excitation voltage.

19. The method of claim 11 comprising the controller determining resistance between a pair of said sensor conductors, and determining, in response to a plurality of said resistances, an area of the structural component associated with multiple occurrences of pooling of an electrically conductive fluid adjacent the membrane at its second side.

20. A system for monitoring moisture at a structural component, the structural component comprising a membrane for fluid impermeability and a deck for supporting the membrane at a first side of the membrane opposite a second side of the membrane, the system comprising:

(a) means for sensing an electrical parameter associated with an electrically conductive fluid adjacent the membrane at the second side, in which the means for sensing comprises a plurality of sensors comprising one or more wireless sensors, each of said one or more wireless sensors comprising a plurality of sensor conductors and a connection member comprising one or more arms connecting the plurality of sensor conductors to each other while electrically insulating said sensor conductors from each other, each said one or more wireless sensors further comprising a transceiver physically attached to said one or more arms;

(b) control means for controlling said means for sensing said electrical parameter associated with said electrically conductive fluid adjacent the membrane at the second side; and (c) means for communicating wirelessly between said control means and said means for sensing said electrical parameter associated with said electrically conductive fluid adjacent the membrane at the second side.

* * * * *